United States Patent
Zhang et al.

(10) Patent No.: US 11,095,343 B2
(45) Date of Patent: Aug. 17, 2021

(54) METHOD AND DEVICE FOR FEEDING BACK AND RECEIVING CHANNEL INFORMATION, AND COMPUTER STORAGE MEDIUM

(71) Applicant: ZTE CORPORATION, Guangdong (CN)

(72) Inventors: Shujuan Zhang, Shenzhen (CN); Zhaohua Lu, Shenzhen (CN); YuNgok Li, Shenzhen (CN); Meng Mei, Shenzhen (CN); Yuhong Gong, Shenzhen (CN); Chuangxin Jiang, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 0 days.

(21) Appl. No.: 16/484,094

(22) PCT Filed: Jan. 5, 2018

(86) PCT No.: PCT/CN2018/071654
§ 371 (c)(1),
(2) Date: Aug. 6, 2019

(87) PCT Pub. No.: WO2018/141196
PCT Pub. Date: Aug. 9, 2018

(65) Prior Publication Data
US 2020/0014430 A1    Jan. 9, 2020

(30) Foreign Application Priority Data
Feb. 6, 2017 (CN) .......................... 201710067275.0

(51) Int. Cl.
*H04B 7/0417* (2017.01)
*H04B 7/0456* (2017.01)
*H04B 7/06* (2006.01)
*H04L 5/00* (2006.01)

(52) U.S. Cl.
CPC ......... *H04B 7/0417* (2013.01); *H04B 7/0486* (2013.01); *H04B 7/0617* (2013.01);
(Continued)

(58) Field of Classification Search
CPC .. H04B 7/0417; H04B 7/0486; H04B 7/0617; H04B 7/0626; H04B 7/0632; H04L 5/0051
(Continued)

(56) References Cited

U.S. PATENT DOCUMENTS

2013/0058386 A1\* 3/2013 Mazzarese ............ H04B 7/063
375/219
2013/0188593 A1    7/2013 Chen et al.
(Continued)

FOREIGN PATENT DOCUMENTS

CN    101969367 A    2/2011
CN    102684850 A    9/2012
(Continued)

OTHER PUBLICATIONS

International Search Report of corresponding Patent Application No. PCT/CN2018/071654—4 pages (dated Apr. 8, 2018).
(Continued)

*Primary Examiner* — Christopher R Crompton
(74) *Attorney, Agent, or Firm* — Knobbe, Martens, Olson & Bear, LLP

(57) ABSTRACT

Provided are a method and device for feeding back and receiving channel information. The method comprises: determining a candidate resource set, selecting M resources from the candidate resource set, and transmitting at least one of indication information or channel state information of the selected M resources to a first communication node, where M is a positive integer; a selection criterion for selecting the M resources from the candidate resource set is determined in
(Continued)

at least one of following manners: a selection criterion or a selection criterion set is agreed with the first communication node, and a selection criterion or a selection criterion set is obtained according to received indication information transmitted by the first communication node, and the selection criterion set comprises at least one selection criterion.

19 Claims, 8 Drawing Sheets

(52) U.S. Cl.
CPC ......... *H04B 7/0626* (2013.01); *H04B 7/0632* (2013.01); *H04L 5/0051* (2013.01)

(58) Field of Classification Search
USPC ........................................................ 370/329
See application file for complete search history.

(56) References Cited

U.S. PATENT DOCUMENTS

| | | | | |
|---|---|---|---|---|
| 2015/0117355 A1* | 4/2015 | Kim | ...................... | H04L 1/0027 370/329 |
| 2015/0139136 A1* | 5/2015 | Zhang | ................... | H04L 5/0053 370/329 |
| 2016/0182133 A1 | 6/2016 | Onggosanusi et al. | | |
| 2016/0197662 A1* | 7/2016 | Wu | ...................... | H04B 7/0639 370/252 |
| 2016/0269084 A1 | 9/2016 | Nam et al. | | |
| 2017/0085303 A1* | 3/2017 | Chen | ................... | H04W 72/046 |
| 2018/0352570 A1* | 12/2018 | Sun | ................... | H04W 72/1289 |

FOREIGN PATENT DOCUMENTS

| | | |
|---|---|---|
| CN | 103944688 A | 7/2014 |
| CN | 105075321 A | 11/2015 |
| CN | 105812033 A | 7/2016 |
| CN | 106160807 A | 11/2016 |
| WO | 2011/137595 A1 | 11/2011 |

OTHER PUBLICATIONS

First Search Report for CN App No. 201710067275.0, dated May 20, 2021.
First Office Action for CN App No. 201710067275.0, dated May 27, 2021.

* cited by examiner

| Receiving unit 701 |
|---|
FIG. 7
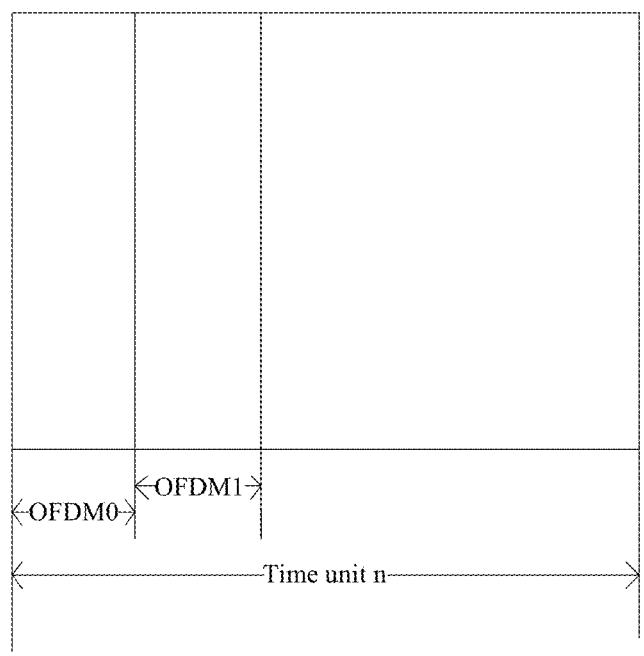
FIG. 8A
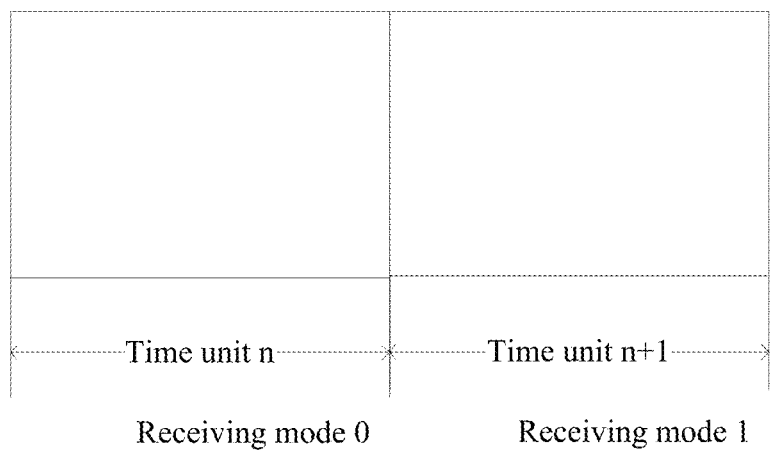
FIG. 8B

METHOD AND DEVICE FOR FEEDING BACK AND RECEIVING CHANNEL INFORMATION, AND COMPUTER STORAGE MEDIUM

CROSS-REFERENCE TO RELATED APPLICATIONS

This is a National Stage Application, filed under 35 U.S.C. 371, of International Patent Application No. PCT/CN2018/071654, filed on Jan. 5, 2018, which claims priority to Chinese patent application No. 201710067275.0 filed on Feb. 6, 2017, contents of both of which are incorporated herein by reference in their entireties.

TECHNICAL FIELD

The present disclosure relates to communication technology and, in particular, to a method and device for feeding back, a method and device for receiving channel information, and computer storage medium.

BACKGROUND

High frequency communication is one of the core technologies of wireless communication technology in the future. The high frequency communication can effectively support communication with a large bandwidth and a large capacity. However, the high frequency communication has large channel fading, which requires use of beams in long distance communication.

Further research is required on following questions: how does a terminal select a beam from multiple beams transmitted by a base station; after the selected beam is fed back to the base station, how does the base station make assumption about these multiple beams fed back by the terminal, especially about receiving conditions of the terminals corresponding to the multiple beams.

On the other hand, in order to assist the base station in performing subsequent beam training and data transmission, further research is also required on what information to be fed back by the terminal in beam training. In addition, further research is also required on how to support multi-layer transmission based on beam mechanism.

SUMMARY

Embodiments of the present disclosure provide a method and device for feeding back, a method and device for receiving channel information, and computer storage medium.

A method for feeding back channel information according to an embodiment of the present disclosure includes steps described below.

A candidate resource set is determined, M resources are selected from the candidate resource set, and at least one of indication information or channel state information of the selected M resources is transmitted to a first communication node, M is a positive integer.

A selection criterion for selecting the M resources from the candidate resource set is determined in at least one of following manners: agreeing a selection criterion or a selection criterion set with the first communication node, or obtaining a selection criterion or a selection criterion set according to received indication information transmitted by the first communication node. The selection criterion set includes at least one selection criterion.

A method for receiving channel information according to an embodiment of the present disclosure includes steps described below.

At least one of indication information or channel state information of M resources transmitted by a second communication node is received, where the M resources are selected by the second communication node.

The M resources are obtained from a candidate resource set by the second communication node based on a selection criterion, the selection criterion includes at least one of following characteristics: agreeing a selection criterion or a selection criterion set with the second communication node, or transmitting the indication information including the selection criterion or the selection criterion set to the second communication node, where the selection criterion set includes at least one selection criterion.

A device for feeding back channel information according to an embodiment of the present disclosure includes a determination unit, a selection unit and a transmitting unit.

The determination unit is configured to determine a candidate resource set.

The selection unit is configured to select M resources from the candidate resource set.

The transmitting unit is configured to transmit at least one of indication information or channel state information of the selected M resources to a first communication node, where M is a positive integer.

A selection criterion for selecting the M resources from the candidate resource set is determined in at least one of following manners: agreeing a selection criterion or a selection criterion set with the first communication node, or obtaining a selection criterion or a selection criterion set according to received indication information transmitted by the first communication node. The selection criterion set includes at least one selection criterion.

A device for receiving channel information according to an embodiment of the present disclosure includes a receiving unit.

The receiving unit is configured to receive at least one of indication information or channel state information of M resources transmitted by a second communication node, where the M resources are selected by the second communication node.

The M resources are obtained from a candidate resource set by the second communication node based on a selection criterion, the selection criterion includes at least one of following characteristics: agreeing a selection criterion or a selection criterion set with the second communication node, or transmitting the indication information including the selection criterion or the selection criterion set to the second communication node. The selection criterion set includes at least one selection criterion.

A method for feeding back channel information according to an embodiment of the present disclosure includes steps described below.

The number of receiving resources is determined, and the number of receiving resources is transmitted to a first communication node.

A method for receiving channel information according to an embodiment of the present disclosure includes a step described below.

A first communication node receives feedback information transmitted by a second communication node, where the feedback information includes the number of receiving resources.

A device for feeding back channel information according to an embodiment of the present disclosure includes a determination unit and a transmitting unit.

The determination unit is configured to determine the number of receiving resources; and the transmitting unit is configured to transmit the number of receiving resources to a first communication node.

A device for receiving channel information according to an embodiment of the present disclosure includes a receiving unit.

The receiving unit is configured to receive feedback information transmitted by a second communication node, where the feedback information includes the number of receiving resources.

A method for feeding back channel information according to an embodiment of the present disclosure includes steps described below.

First feedback information is transmitted.

At least one of a dimension of second feedback information or a codebook restriction set of the second feedback information is determined according to non-zero elements in the first feedback information or a relationship between elements in the first feedback information and a predetermined threshold.

In an embodiment of the present disclosure, the method further includes a step in which the second feedback information is transmitted.

In an embodiment of the present disclosure, different layers in the first feedback information correspond to different non-zero elements.

The step in which the dimension of the second feedback information is determined according to the number of non-zero elements in the first feedback information includes a step described below.

The dimension of the second feedback information corresponding to a layer is determined according to the number of non-zero elements in the first feedback information corresponding to the layer.

A device for feeding back channel information according to an embodiment of the present disclosure includes a transmitting unit and a determination unit.

The transmitting unit is configured to transmit first feedback information.

The determination unit is configured to determine at least one of a dimension of second feedback information or a codebook restriction set of the second feedback information according to non-zero elements in the first feedback information or a relationship between elements in the first feedback information and a predetermined threshold.

A method for feeding back channel information according to an embodiment of the present disclosure includes steps described below.

Signaling information is received, where the signaling information includes rank information.

At least one of channel measurement or channel information feedback is performed according to the rank information.

In an embodiment of the present disclosure, the rank information includes one of following characteristics:

the rank information corresponding to a measurement reference signal resource represents the maximum number of layers supported by the measurement reference signal resource; or the rank information corresponding to a measurement reference signal resource represents a set of layers supported by the measurement reference signal resource.

In an embodiment of the present disclosure, the rank information is determined in one of following manners:

the rank information is determined based on a measurement reference signal resource;

the rank information is determined based on a plurality of measurement reference signal resources;

the rank information is determined based on configuration of a channel state information reference signal (CSI-RS) report setting;

the rank information is determined based on a configuration of a link, where the link is configured to associate a resource set with a report setting;

the rank information is determined based on a fed back CSI-RS resource indication (CRI); or the rank information is determined based on fed back set index information of the N first sets, where N is a positive integer.

A device for feeding back channel information according to an embodiment of the present disclosure includes a receiving unit and a feedback unit.

The receiving unit is configured to receive signaling information, where the signaling information includes rank information.

The feedback unit is configured to perform at least one of channel measurement or channel information feedback according to the rank information.

A method for feeding back channel information according to an embodiment of the present disclosure includes a step described below.

Signaling information is transmitted, where the signaling information includes rank information.

The rank information is used for indicating a second communication node to perform at least one of channel measurement or channel information feedback, where the second communication node is a receiving end of the signaling information.

A device for feeding back channel information according to an embodiment of the present disclosure includes a transmitting unit.

The transmitting unit is configured to transmit signaling information, where the signaling information includes rank information.

The rank information is used for indicating a second communication node to perform at least one of channel measurement or channel information feedback, where the second communication node is a receiving end of the signaling information.

In the present disclosure, a candidate resource set is determined, M resources are selected from the candidate resource set, and at least one of indication information or channel state information of the selected M resources is transmitted to a first communication node, where M is a positive integer. A selection criterion for selecting the M resources from the candidate resource set is determined in at least one of following manners: a selection criterion or a selection criterion set is agreed with the first communication node, or a selection criterion or a selection criterion set is obtained according to received indication information transmitted by the first communication node. The selection criterion set includes at least one selection criterion. Through the embodiments of the present disclosure, a terminal can select a beam from multiple beams transmitted by the base station, so as to implement long distance communication through beams.

BRIEF DESCRIPTION OF DRAWINGS

The embodiments of the present disclosure are illustrated by the drawings in general by way of example and not limitation.

FIG. 7 is a schematic diagram of structural composition of a device for receiving channel information according to an embodiment of the present disclosure.

FIG. 8a is a schematic diagram one illustrating determination of the number of time division signal transmitting units according to the number of receiving resources according to an embodiment of the present disclosure.

FIG. 8b is a schematic diagram two illustrating determination of the number of time division signal transmitting units according to the number of receiving resources according to an embodiment of the present disclosure.

DETAILED DESCRIPTION

In order to understand characteristics and technical contents of the embodiments of the present disclosure in details, the embodiments of the present disclosure will be described in detail below with reference to the drawings, which are for reference only and not intended to limit the embodiments of the present disclosure.

Figures 1, 2:
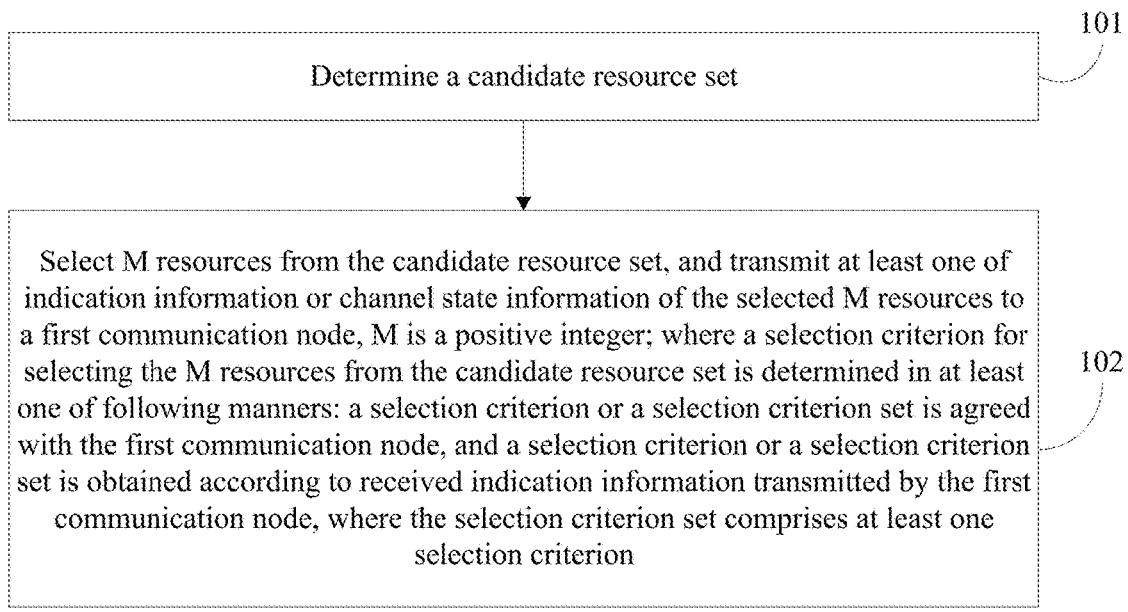
FIG. 1 is a flowchart of a method for feeding back channel information according to an embodiment of the present disclosure.
FIG. 2 is a flowchart of a method for receiving channel information according to an embodiment of the present disclosure.

FIG. 1 is a flowchart of a method for feeding back channel information according to an embodiment of the present disclosure. As shown in FIG. 1, the method includes steps described below.

In step 101, a candidate resource set is determined.

In step 102, M resources are selected from the candidate resource set, and at least one of indication information or channel state information of the selected M resources is transmitted to a first communication node, M is a positive integer. Where a selection criterion for selecting the M resources from the candidate resource set is determined in at least one of following manners: a selection criterion or a selection criterion set is agreed with the first communication node, or a selection criterion or a selection criterion set is obtained according to received indication information transmitted by the first communication node, where the selection criterion set includes at least one selection criterion.

In an embodiment of the present disclosure, the M resources are selected according to at least one of following information:
channel quality of resources;
a correlation degree of resources;
a receiving resource corresponding to resources;
a transmitting resource corresponding to resources;
an arrival time interval of resources; or
multipath characteristics corresponding to resources.

In an embodiment of the present disclosure the selection criterion includes at least one of:
M resources with optimal channel quality from the candidate resource set are selected as the M resources;

X1 resources with optimal channel quality are selected from the candidate resource set, R1 receiving resources corresponding to the X1 resources with the optimal quality are determined, and M transmitting resources with optimal channel quality are selected from all transmitting resources corresponding to the receiving resources;

X1 resources with optimal channel quality are selected from the candidate resource set, R1 receiving resources corresponding to the X1 resources with the optimal quality are determined, channel quality sum of each transmitting resource in the R1 receiving resources is determined, and M transmitting resources with an optimal channel quality sum are selected;

X2 resources with optimal channel quality are selected from the candidate resource set, R2 receiving resources corresponding to the X2 resources with the optimal channel quality are determined, and at least one transmitting resource with optimal channel quality for each of the R2 receiving resources is determined to form the M resources;

an optimal receiving resource for each transmitting resource is selected from the candidate resource set to obtain T resources, and M resources with optimal channel quality are selected from the T resources;

an optimal transmitting resource for each receiving resource is selected from the candidate resource set to obtain R resources, and M resources with optimal channel quality are selected from the R resources;

M resources are selected from the candidate resource set, where the M resources form an equivalent channel with a maximum rank;

M resources are selected from the candidate resource set, where the M resources form an equivalent channel with a maximum channel capacity;

R1 receiving resources and M transmitting resources are selected from the candidate resource set, where an equivalent channel formed by the M transmitting resources and the R1 receiving resources has a channel matrix with a maximum rank;

R1 receiving resources and M transmitting resources are selected from the candidate resource set, where an equivalent channel formed by the M transmitting resources and the R1 receiving resources has a channel matrix with a maximum channel capacity;

R1 receiving resources are selected from the candidate resource set, and M1 resources with a minimum correlation degree of channel response are selected for each of the R1 receiving resources, where all resources selected for the R1 receiving resources form the M resources;

the M resources are selected according to a correlation degree of resources and channel quality of resources;

the M resources are selected according to the correlation degree of resources;

the M resources with a difference interval of channel quality greater than a predetermined threshold are selected;

the M resources with an arrival time interval greater than the predetermined threshold are selected;

M resources with a maximum time energy sum are selected from the candidate resource set, where a time energy sum corresponding to a resource is a sum of products of arrival time and signal energy of multiple paths corresponding to the resource;

M resources with a worst channel quality are selected from the candidate resource set as the M resources; or resources in the candidate resource set are sorted according to channel quality of resources, and one resource in every predetermined number of resources is selected to obtain the M resources.

X1 and X2 are natural numbers less than or equal to N1, and N1 is the number of resources included in the candidate resource set; R1, R2 and R are natural number less than or equal to R_Total, and R_Total is the number of receiving resources included in the candidate resource set; where T and M1 are natural numbers less than or equal to T_Total, and T_Total is the number of transmitting resources included in the candidate resource set.

In an embodiment of the present disclosure, the selection of the M resources according to the correlation degree of resources and the channel quality of resources satisfies one of following characteristics:

the channel quality of the M resources satisfies a first predetermined condition, or a correlation degree of the M resources satisfies a second predetermined condition.

resources with channel quality satisfying the first predetermined condition are selected from the candidate resource set first, and then resources with a resource correlation degree satisfying the second predetermined condition are selected from the selected resources to obtain the M resources; and resources with a resource correlation degree satisfying the second predetermined condition are selected from the candidate resource set first, and then resources with channel quality satisfying the first predetermined condition are selected from the selected resources to obtain the M resources.

Here, the first predetermined condition indicates Mx resources with optimal channel quality (Mx may be greater than or equal to M), or with channel quality greater than a predetermined threshold. The second predetermined condition indicates Mx resources with a minimum correlation degree (Mx may be greater than or equal to M), or with a correlation degree less than a predetermined threshold, or with a correlation degree of any two of the Mx resources being 0, that is, any two of the Mx resources are orthogonal.

In an embodiment of the present disclosure, the M resources selected according to the correlation degree of resources satisfy at least one of following characteristics:

the M resources are M resources with a minimum correlation degree in the candidate resource set;

the correlation degree of the M resources is less than or equal to the predetermined threshold;

the M resources are composed of resources with a correlation degree less than or equal to the predetermined threshold in the candidate resource set; the correlation degree of any two of the M resources is 0; or the correlation degree of every two of the M resources has a sum less than or equal to a sum of correlation degrees of every two of resources in a first resource subset, where the first resource subset is composed of any M resources in the candidate resource set.

Here, a correlation degree of 0 means that two resources are orthogonal.

In an embodiment of the present disclosure, each resource in the candidate resource set includes a transmitting resource and a receiving resource.

In an embodiment of the present disclosure, the indication information of the M resources includes at least one of following characteristics:

the number of receiving resources included in the M resources is less than or equal to M;

the number of transmitting resources included in the M resources is less than or equal to M;

the M resources comprise a receiving resource and M transmitting resources;

the M resources comprise M receiving resources and a transmitting resource;

the M resources comprise M receiving resources and M transmitting resources;

one or more transmitting resources of the M resources sharing a receiving resource have a minimum correlation degree among all correlation degrees of all transmitting resources sharing the receiving resource;

a channel response matrix of an equivalent channel formed by receiving resources and transmitting resources of the M resources has a maximum rank; or a channel response matrix of an equivalent channel formed by the receiving resources and the transmitting resources of the M resources has a maximum channel capacity.

In an embodiment of the present disclosure, a value of M is determined in at least one of following manners:

the indication information carrying the value of M transmitted by the first communication node is received;

the value of M is determined according to channel quality threshold agreed with the first communication node;

the value of M is determined according to a threshold for correlation between resources agreed with the first communication node;

the value of M is determined according to M_Max, where M_Max is a value agreed with the first communication node, and the value of M agreed with the first communication node is less than or equal to the M_Max;

the value of M is determined according to the number of receiving resources;

it is agreed with the first communication node that the value of M value is equal to the number of resources included in the candidate resource set;

the value of M is determined according to the number of receiving antennas; or the value of M is determined according to the number of receiving panels.

In an embodiment of the present disclosure, the indication information transmitted by the first communication node carries a feedback type, and the selection criterion is obtained according to the feedback type; or, the indication information transmitted by the first communication node carries feature types satisfied by the M resources, and the selection criterion is obtained according to the feature types.

In an embodiment of the present disclosure, the indication information of the M resources includes index information of transmitting resources and quantity information of receiving resources; or, the indication information of the M resources includes the index information of transmitting resources and quantity information of receiving resources corresponding to each transmitting resource.

In an embodiment of the present disclosure the candidate resource set includes one of following characteristics:

the candidate resource set includes N first sets, each first set corresponds to a piece of rank information, and N is a natural number;

the candidate resource set corresponds to a piece of rank information; or the rank information is included in configuration information of a second set related to the candidate resource set.

In an embodiment of the present disclosure, the rank information includes one of following characteristics:

the rank information is obtained through the indication information transmitted by the first communication node, where the indication information transmitted by the first communication node may be different from the above indication information of the M resources;

the rank information corresponding to a set represents the maximum number of layers supported by the set;

the rank information corresponding to a set represents the number of layers supported by the set;

selected rank information is obtained according to the N first sets, and is fed back to the first communication node; or the selected rank information is fed back implicitly through feeding back set index information of the N first sets.

In an embodiment of the present disclosure the second set includes at least one of: a channel state information (CSI) report setting, a CSI measurement set, or a connection set, where the CSI measurement set includes at least one connection, and each connection includes a resource set and a report setting.

In an embodiment of the present disclosure, X1 is equal to 1 and/or X2 is equal to 1.

Each of R1, R2 and R is equal to an integral multiple of the number of receiving antennas.

In an embodiment of the present disclosure, the channel state information of the M resources includes at least one of following characteristics:

channel quality information of each of the M resources is fed back;

channel quality of a resource with optimal channel quality in the M resources is fed back;

channel quality of a resource with worst channel quality in the M resources is fed back; or average channel quality of the M resources is fed back.

The channel state information includes at least one of following information: a reference signal receiving power (RSRP), a channel quality indication (CQI), a precoding matrix indication (PMI), or a rank indication (RI).

In an embodiment of the present disclosure, the indication information of the M resources includes at least one of following characteristics:

resources are sorted according to channel quality of the resources in the indication information of the M resources;

the M resources comprise all resources of the candidate resource set;

the indication information of the M resources includes the value of M;

the indication information of the M resources further includes indication information of the selection criterion, where the M resources are obtained based on the selection criterion;

the indication information of the M resources includes indication information for grouping; or the indication information of the M resources includes indication information for multi-level grouping.

In an embodiment of the present disclosure, the grouping includes at least one of following characteristics:

resources in a first level group are quasi-co-located concerning a first type channel characteristic parameter;

resources in a second level group are quasi-co-located concerning a second type channel characteristic parameter;

resources in a same group have a correlation degree less than or equal to a predetermined threshold; or resources in different groups have a correlation degree greater than the predetermined threshold.

An example of resources in a same group with a correlation degree greater than the predetermined threshold is not excluded here.

In an embodiment of the present disclosure the first type and second type channel characteristic parameters comprise at least one of following characteristics:

the first type channel characteristic parameter is different from the second type channel characteristic parameter;

the first type channel characteristic parameter is a subset of the second type channel characteristic parameter; or one of the first type channel characteristic parameter or the second type channel characteristic parameter includes a channel characteristic parameter of an average delay.

The first type channel characteristic parameter includes at least one of following parameters: a receiving panel, a transmitting panel, an average arrival angle, a center arrival angle, an average angle extension, a vertical average arrival angle, a horizontal average arrival angle, an average departure angle, a center departure angle, a vertical average departure angle, a horizontal average departure angle, a multipath extension, or an average gain; and the second type channel characteristic parameter includes at least one of following parameters: a receiving antenna, the average arrival angle, the center arrival angle, the average angle extension, the vertical average arrival angle, the horizontal average arrival angle, the average departure angle, the center departure angle, the vertical average departure angle, the horizontal average departure angle, the average delay, the multipath extension, or the average gain.

In an embodiment of the present disclosure, the indication information transmitted by the first communication node includes at least one of following indication information:

indication information of a radio resource control (RRC) signaling;

indication information of a medium access control (MAC) control element (CE) signaling; or indication information of a downlink control information (DCI) signaling.

A method for feeding back channel information is further provided according to an embodiment of the present disclosure, the method includes steps described below.

The number of receiving resources is determined, and the number of the receiving resources is transmitted to a first communication node.

In an embodiment, the number of the receiving resources has a relationship with at least one of following information:

the number of time domain units required by signals, where the signals are transmitted by the first communication node after receiving feedback information;

the number of reference signal ports;

the number of precoding polling periods; or the number of precoding units.

In an embodiment, the number of the receiving resources includes one of following characteristics:

the number of the receiving resources is the number of receiving resources corresponding to a transmitting resource;

the number of the receiving resources is the number of receiving resources corresponding to more than one transmitting resources; or the number of the receiving resources is the number of receiving resources corresponding to a second receiving resource.

FIG. 2 is a flowchart of a method for receiving channel information according to an embodiment of the present disclosure. As shown in FIG. 2, the method includes a step described below.

In step 201, at least one of indication information or channel state information of M resources transmitted by a second communication node is received, where the M resources are selected by the second communication node. The M resources are obtained from a candidate resource set by the second communication node based on a selection criterion, the selection criterion includes at least one of following characteristics: a selection criterion or a selection criterion set is agreed with the second communication node, or the indication information including the selection criterion or the selection criterion set is transmitted to the second communication node, where the selection criterion set includes at least one selection criterion.

In an embodiment of the present disclosure, the M resources are selected according to at least one of following information:

channel quality of resources;
a correlation degree of resources;
a receiving resource corresponding to resources;
a transmitting resource corresponding to resources;
an arrival time interval of resources; or
multipath characteristics corresponding to resources.

In an embodiment of the present disclosure, the selection criterion includes at least one of:

M resources with optimal channel quality are selected from the candidate resource set as the M resources;

X1 resources with optimal channel quality are selected from the candidate resource set, R1 receiving resources corresponding to the X1 resources with the optimal quality are determined, and M transmitting resources with optimal channel quality are selected from all transmitting resources corresponding to the receiving resources;

X1 resources with optimal channel quality are selected from the candidate resource set, R1 receiving resources corresponding to the X1 resources with the optimal quality are determined, channel quality sum of each transmitting resource in the R1 receiving resources is determined, and M transmitting resources with an optimal channel quality sum are selected;

X2 resources with optimal channel quality are selected from the candidate resource set, R2 receiving resources corresponding to the X2 resources with the optimal channel quality are determined, and at least one transmitting resource with optimal channel quality for each of the R2 receiving resources is selected to form the M resources;

an optimal receiving resource for each transmitting resource is selected from the candidate resource set to obtain T resources, and M resources with optimal channel quality are selected from the T resources;

an optimal transmitting resource for each receiving resource is selected from the candidate resource set to obtain R resources, and M resources with optimal channel quality are selected from the R resources;

M resources are selected from the candidate resource set, where the M resources form an equivalent channel with a maximum rank;

M resources are selected from the candidate resource set, where the M resources form an equivalent channel with a maximum channel capacity;

R1 receiving resources and M transmitting resources are selected from the candidate resource set, where an equivalent channel formed by the M transmitting resources and the R1 receiving resources has a channel matrix with a maximum rank;

R1 receiving resources and M transmitting resources are selected from the candidate resource set, where an equivalent channel formed by the M transmitting resources and the R1 receiving resources has a channel matrix with a maximum channel capacity;

R1 receiving resources are selected from the candidate resource set, and M1 resources with a minimum correlation degree of channel response are selected for each of the R1 receiving resources, where all resources selected for the R1 receiving resources form the M resources;

the M resources are selected according to a correlation degree of resources and channel quality of resources;

the M resources are selected according to the correlation degree of resources;

the M resources with a difference interval of channel quality greater than a predetermined threshold are selected;

the M resources with an arrival time interval greater than the predetermined threshold are selected;

M resources with a maximum time energy sum are selected from the candidate resource set, where a time energy sum corresponding to a resource is a sum of products of arrival time and signal energy of multiple paths corresponding to the resource;

M resources with a worst channel quality are selected from the candidate resource set as the M resources; or resources in the candidate resource set are sorted according to channel quality of resources, and one resource in every predetermined number of resources is selected to obtain the M resources.

X1 and X2 are natural numbers less than or equal to N1, and N1 is the number of resources included in the candidate resource set; R1, R2 and R are natural numbers less than or equal to R_Total, and R_Total is the number of receiving resources included in the candidate resource set; T and M1 are natural numbers less than or equal to T_Total, and T_Total is the number of transmitting resources included in the candidate resource set.

The candidate resource set is agreed in advance with the second communication node, and each resource in the candidate resource set includes a transmitting resource and a receiving resource.

In an embodiment of the present disclosure, the selection of the M resources according to the correlation degree of resources and the channel quality of resources satisfies one of following characteristics:

channel quality of the M resources satisfies a first predetermined condition and a correlation degree of the M resources satisfies a second predetermined condition.

resources with channel quality satisfying the first predetermined condition are selected from the candidate resource set first, and then resources with a resource correlation degree satisfying the second predetermined condition are selected from the selected resources to obtain the M resources; or resources with a correlation degree of resources satisfying the second predetermined condition are selected from the candidate resource set first, and then resources with channel quality satisfying the first predetermined condition are selected from the selected resources to obtain the M resources.

In an embodiment of the present disclosure, the M resources selected according to the correlation degree of resources satisfy at least one of following characteristics:

the M resources are M resources with a minimum correlation degree in the candidate resource set;

the correlation degree of the M resources is less than or equal to the predetermined threshold;

the M resources are composed of resources with a correlation degree less than or equal to the predetermined threshold in the candidate resource set; the correlation degree of any two of the M resources is 0; or a correlation degree of every two of the M resources has a sum less than or equal to a sum of a correlation degree of every two of resources in a first resource subset, where the first resource subset is composed of any M resources in the candidate resource set.

In an embodiment of the present disclosure, the M resources comprise at least one of following characteristics:

the number of receiving resources included in the M resources is less than or equal to M;

the number of transmitting resources included in the M resources is less than or equal to M;

the M resources comprise a receiving resource and M transmitting resources;

the M resources comprise M receiving resources and a transmitting resource;

the M resources comprise M receiving resources and M transmitting resources;

one or more transmitting resources of the M resources sharing a receiving resource have a minimum correlation degree among all correlation degrees of all transmitting resources sharing the receiving resource;

a channel response matrix of an equivalent channel formed by receiving resources and transmitting resources of the M resources has a maximum rank; or a channel response matrix of an equivalent channel formed by the receiving resources and the transmitting resources of the M resources has a maximum channel capacity.

In an embodiment of the present disclosure, M-related information is determined and/or notified in at least one of following manners:

indication information carrying a value of M is transmitted to the second communication node;

indication information carrying threshold information of channel quality is transmitted to the second communication node;

indication information carrying threshold information of a resource correlation degree is transmitted to the second communication node;

indication information carrying M_Max is transmitted to the second communication node, where the value of M agreed with the second communication node is less than or equal to M_Max;

the value of M is transmitted according to the number of receiving resources;

it is agreed with the second communication node that the value of M is equal to the number of resources included in the candidate resource set;

the value of M is determined according to the number of receiving antennas of the second communication node; or the value of M is determined according to the number of receiving panels of the second communication node.

In an embodiment of the present disclosure, the indication information transmitted to the second communication node carries a feedback type, and the selection criterion is notified through the feedback type; or, the indication information transmitted to the second communication node carries feature types satisfied by the M resources, and the selection criterion is notified through the feature types.

In an embodiment of the present disclosure, the indication information of the M resources includes index information of transmitting resources and quantity information of receiving resources; or, the indication information of the M resources includes the index information of transmitting resources and quantity information of receiving resources corresponding to each transmitting resource.

In an embodiment of the present disclosure, the candidate resource set includes one of following characteristics:

the candidate resource set includes N first sets, each first set corresponds to a piece of rank information, and N is a natural number;

the candidate resource set corresponds to a piece of rank information; or the rank information is included in configuration information of a second set related to the candidate resource set.

In an embodiment of the present disclosure, the rank information includes one of following characteristics:

the rank information is configured through the indication information transmitted to the second communication node;

the rank information corresponding to a set represents the maximum number of layers supported by the set;

the rank information corresponding to a set represents the number of layers supported by the set;

the second communication node is configured to obtain feedback information of a rank indication (RI) according to the N first sets; or index information of the N first sets fed back by the second communication node is received to obtain a value of the R1 selected by the second communication node.

In an embodiment of the present disclosure, the second set includes at least one of: a channel state information (CSI) report setting, a CSI measurement set, or a connection set, where the CSI measurement set includes at least one connection, and each connection includes a resource set and a report setting.

In an embodiment of the present disclosure, X1 is equal to 1 and/or X2 is equal to 1.

Each of R1, R2 and R is equal to an integral multiple of the number of receiving antennas.

In an embodiment of the present disclosure, the channel state information of the M resources includes at least one of following characteristics:

channel quality information of each of the M resources is fed back;

channel quality of a resource with optimal channel quality in the M resources is fed back;

channel quality of a resource with worst channel quality in the M resources is fed back; or average channel quality of the M resources is fed back.

In an embodiment of the present disclosure, the indication information of the M resources includes at least one of following characteristics:

resources are sorted according to channel quality of the resources in the indication information of the M resources;

the M resources comprise all resources of the candidate resource set;

the indication information of the M resources includes the value of M;

the indication information of the M resources further includes indication information of the selection criterion, where the M resources are obtained based on the selection criterion;

the indication information of the M resources includes indication information for grouping; or the indication information of the M resources includes indication information for multi-level grouping.

In an embodiment of the present disclosure, the grouping includes at least one of following characteristics:

resources in a first level group are quasi-co-located concerning a first type channel characteristic parameter;

resources in a second level group are quasi-co-located concerning a second type channel characteristic parameter;

resources in a same group have a correlation degree less than or equal to a predetermined threshold; or resources in different groups have a correlation degree greater than the predetermined threshold.

In an embodiment of the present disclosure, the first type and second type channel characteristic parameters comprise at least one of following characteristics:

the first type channel characteristic parameter is different from the second type channel characteristic parameter;

the first type channel characteristic parameter is a subset of the second type channel characteristic parameter; or one of the first type channel characteristic parameter or the second type channel characteristic parameter includes a channel characteristic parameter of an average delay.

The first type channel characteristic parameter includes at least one of following parameters: a receiving panel, a transmitting panel, an average arrival angle, a center arrival angle, an average angle extension, a vertical average arrival angle, a horizontal average arrival angle, an average departure angle, a center departure angle, a vertical average departure angle, a horizontal average departure angle, a multipath extension, or an average gain.

The second type channel characteristic parameter includes at least one of following parameters: a receiving antenna, the average arrival angle, the center arrival angle, the average angle extension, the vertical average arrival angle, the horizontal average arrival angle, the average departure angle, the center departure angle, the vertical average departure angle, the horizontal average departure angle, the average delay, the multipath extension, or the average gain.

In an embodiment of the present disclosure, the indication information transmitted to the second communication node includes at least one of following indication information:

indication information of a RRC signaling;

indication information of a MAC CE signaling; or indication information of a DCI signaling.

In an embodiment of the present disclosure, indication information for notifying of the selection criterion includes receiving state type information of the second communication node corresponding to the channel state information of the second communication node; and/or, the channel state information fed back by the second communication node is received, and receiving state information of the second communication node corresponding to the channel state information of the second communication node is determined.

In an embodiment of the present disclosure, the channel state information reported by the second communication node is received, and a correspondence between the channel state and a receiving state of the second communication node includes at least one of:

the channel state is obtained by the second communication node using one receiving beam of one TXRU;

the channel state is obtained by the second communication node using all TXRUs of one panel;

the channel state is obtained by the second communication node using part of panels, where all TXRUs in each of the part of panels are used;

the channel state is obtained by the second communication node using part of panels, all or part of TXRUs in each of the part of panels are used; or the channel state is obtained by the second communication node using all TXRUs of all panels.

In an embodiment of the present disclosure, a method for receiving channel information is provided. The method includes a step described below.

A first communication node receives feedback information transmitted by a second communication node, where the feedback information includes the number of receiving resources.

In an embodiment, the method further includes a step in which transmission information of a signal is determined by the first communication node according to the feedback information transmitted by the second communication node, where the signal is transmitted by the first communication node to the second communication node.

In an embodiment, the transmission information includes at least one of following information:

the number of time domain units required for transmitting signals;

the number of reference signal ports;

a precoding polling period; or the number of precoding units.

In an embodiment, the number of receiving resources has a relationship with at least one of following information:

the number of time domain units required for transmitting the signal, where the signal is transmitted by the first communication node after receiving feedback information;

the number of reference signal ports;

a precoding polling period; or the number of precoding units.

In an embodiment, the receiving resources comprise one of following characteristics:

the number of receiving resources is the number of receiving resources corresponding to a transmitting resource;

the number of receiving resources is the number of receiving resources corresponding to more than one transmitting resources; or the number of the receiving resources is the number of receiving resources corresponding to a second receiving resource.

In an embodiment of the present disclosure, a method for feeding back channel information is provided. The method includes steps described below.

First feedback information is transmitted.

At least one of a dimension of second feedback information or a codebook restriction set of the second feedback information is determined according to non-zero elements in the first feedback information or a relationship between elements in the first feedback information and a predetermined threshold.

In an embodiment, the method further includes a step below.

When the second feedback information has a dimension larger than 0, the second feedback information is transmitted.

In an embodiment, different layers in the first feedback information correspond to different non-zero elements, or different layers in the first feedback information correspond to different numbers of elements with a value greater than the predetermined threshold.

The step in which the dimension of the second feedback information is determined according to the non-zero elements in the first feedback information or the relationship between the elements in the first feedback information and the predetermined threshold includes one of following steps:

the dimension of the second feedback information corresponding to a layer is determined according to the number of non-zero elements in the first feedback information corresponding to the layer; or, the dimension of the second feedback information corresponding to a layer is determined according to the number of elements with a value greater than the predetermined threshold in the first feedback information corresponding to the layer.

In an embodiment, the step in which at least one of the dimension of the second feedback information or the codebook restriction set of the second feedback information is determined according to the relationship between the elements in the first feedback information and the predetermined threshold includes a step described below.

At least one of the dimension of the second feedback information or the codebook restriction set of the second feedback information is determined according to the number of the elements with a value greater than the predetermined threshold in the first feedback information.

In an embodiment, D information elements in the second feedback information correspond to D non-zero elements in the first feedback information; or, the D information elements in the second feedback information correspond to D elements with a value greater than the predetermined threshold in the first feedback information; wherein D is greater than or equal to 0, and less than or equal to a number of the elements in the first feedback information.

In an embodiment of the present disclosure, a device for feeding back channel information is provided. The device includes a transmitting unit and a determination unit.

The transmitting unit is configured to transmit first feedback information.

The determination unit is configured to determine at least one of a dimension of second feedback information or a codebook restriction set of the second feedback information, according to non-zero elements in the first feedback information or a relationship between elements in the first feedback information and a predetermined threshold.

In an embodiment, the transmitting unit is further configured to transmit the second feedback information when the second feedback information has a dimension larger than 0.

In an embodiment, different layers in the first feedback information correspond to different non-zero elements, or different layers in the first feedback information correspond to different numbers of elements with a value greater than the predetermined threshold.

The determination unit is specifically configured to determine the dimension of the second feedback information corresponding to a layer according to the number of non-zero elements in the first feedback information corresponding to the layer; or, determine the dimension of the second feedback information corresponding to a layer according to the number of elements with a value greater than the predetermined threshold in the first feedback information corresponding to the layer.

In an embodiment, the determination unit is specifically configured to determine at least one of the dimension of the second feedback information or the codebook restriction set of the second feedback information, according to the number of the elements with the value greater than the predetermined threshold in the first feedback information.

In the solution, D information elements in the second feedback information correspond to D non-zero elements in the first feedback information; or, the D information elements in the second feedback information correspond to D elements with a value greater than the predetermined threshold in the first feedback information; wherein D is greater than or equal to 0, and less than or equal to a number of the elements in the first feedback information.

In the embodiments of the present disclosure, a method for feeding back channel information is provided. The method includes steps described below.

Signaling information is received, where the signaling information includes rank information.

At least one of channel measurement or channel information feedback is performed according to the rank information.

In an embodiment, the rank information includes one of following characteristics:

the rank information corresponding to a measurement reference signal resource represents the maximum number of layers supported by the measurement reference signal resource; or the rank information corresponding to a measurement reference signal resource represents a set of layers supported by the measurement reference signal resource.

In an embodiment, the rank information is determined based on one of following manners:

the rank information is determined based on a measurement reference signal resource;

the rank information is determined based on a plurality of measurement reference signal resources;

the rank information is determined based on configuration of a channel state information reference signal (CSI-RS) report setting;

the rank information is determined based on a configuration of a link, where the link is configured to associate a resource set with a report setting;

the rank information is determined based on a fed back CSI-RS resource indication (CRI); or the rank information is determined based on fed back set index information of the N first sets, where N is a positive integer.

In the embodiments of the present disclosure a method for feeding back channel information is provided, the device includes a receiving unit and a feedback unit.

The receiving unit is configured to receive signaling information rank information, the signaling information includes rank information; and the feedback unit is configured to perform at least one of channel measurement or channel information feedback according to the rank information.

In an embodiment, the rank information includes one of following characteristics:

the rank information corresponding to a measurement reference signal resource represents the maximum number of layers supported by the measurement reference signal resource; or the rank information corresponding to a measurement reference signal resource represents a set of layers supported by the measurement reference signal resource.

In an embodiment, the rank information is determined based on one of following manners:

the rank information is determined based on a measurement reference signal resource;

the rank information is determined based on a plurality of measurement reference signal resources;

the rank information is determined based on configuration of a channel state information reference signal (CSI-RS) report setting;

the rank information is determined based on a configuration of a link, where the link is configured to associate a resource set with a report setting;

the rank information is determined based on a fed back CSI-RS resource indication (CRI); or the rank information is determined based on fed back set index information of N first sets, where N is a positive integer.

In an embodiment of the present disclosure, a device for feeding back channel information is provided. The device includes a transmitting unit.

The transmitting unit is configured to transmit signaling information, where the signaling information includes rank information. The rank information is used for indicating a second communication node to perform at least one of channel measurement or channel information feedback, where the second communication node is a receiving end of the signaling information.

In an embodiment, the rank information includes one of following characteristics:

the rank information corresponding to a measurement reference signal resource represents the maximum number of layers supported by the measurement reference signal resource; or the rank information corresponding to a measurement reference signal resource represents a set of layers supported by the measurement reference signal resource.

In an embodiment, the rank information is determined based on one of following manners: the rank information is determined based on a measurement reference signal resource; the rank information is determined based on a plurality of measurement reference signal resources;

the rank information is determined based on a configuration of a report setting of CSI-RSs;

the rank information is determined based on a configuration of a link, where the link is configured to associate a resource set with a report setting;

the rank information is determined based on a fed back CSI-RS resource indication (CRI); or the rank information is determined based on fed back set index information of the N first sets, where N is a positive integer.

The embodiments of the present disclosure will be described in further detail below with reference to specific application scenarios.

Figure 5:
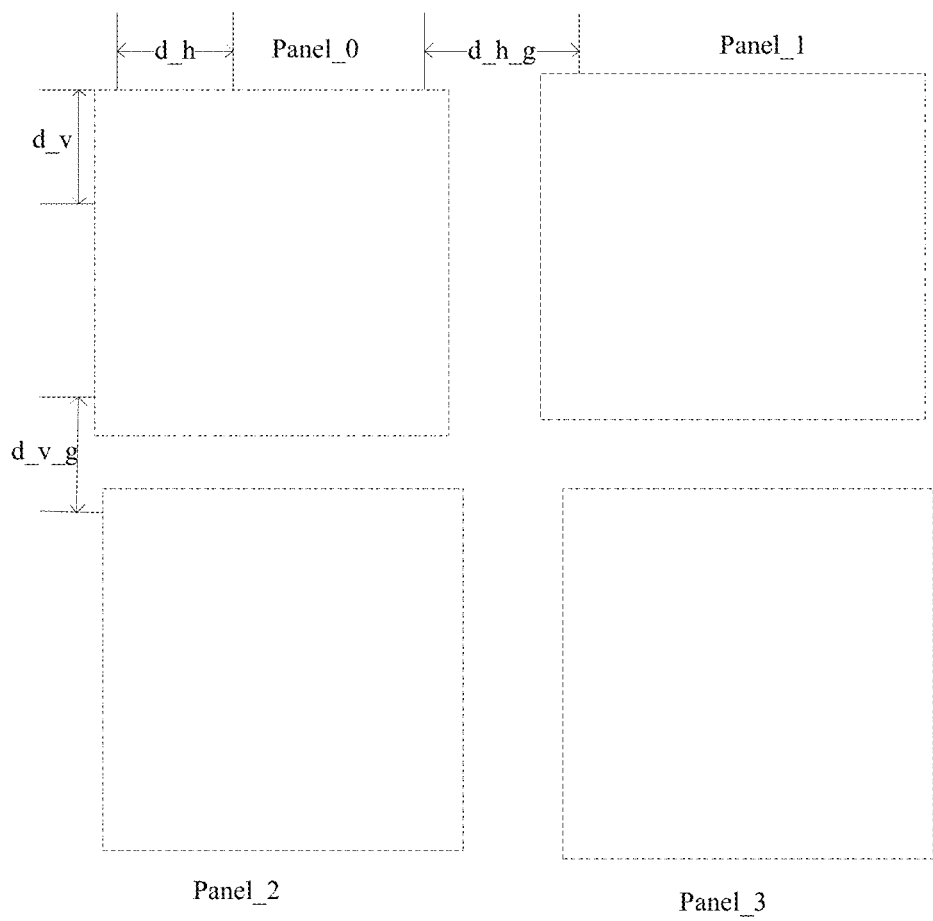
FIG. 5 is a schematic diagram of panels and TXRUs according to an embodiment of the present disclosure.

In following embodiments, a terminal (or base station) may have multiple panels. As shown in FIG. 5, each panel corresponds to an antenna oscillator matrix. The oscillator in a matrix are arranged at a horizontal distance and a vertical distance denoted as (d_v, d_h), panels are arranged at a horizontal distance and a vertical distance denoted as (d_v_g, d_h_g). In general, (d_v_g, d_h_g) are different from (d_v, d_h). Each panel may have one or more TXRUs, and each TXRU may only correspond to one radio frequency beam at a time. For example, in FIG. 5, each column in panel_0 corresponds to one TXRU, the panel_0 corresponds to three TXRUs in a single polarization mode and six TXRUs in a dual polarization mode.

Embodiment 1

In this embodiment, a terminal selects M resources from a candidate resource set, and feeds back at least one of the indication information or the channel quality information of the selected M resources to a base station (i.e. the first communication node). A selection criterion for selecting the M resources from the candidate resource set is determined in at least one of following manners: a selection criterion or a selection criterion set is agreed with the first communication node, or a selection criterion or a selection criterion set is obtained according to received indication information transmitted by the first communication node, where the selection criterion set includes at least one selection criterion.

Before selecting the M resources, the terminal determines the candidate resource set. After that, the terminal selects M resources from the candidate resource set.

Resources in the candidate resource set include at least one of following resources: a transmitting beam resource, a transmitting antenna resource, a transmitting port resource, a transmitting frequency domain resource, a transmitting sequence resource, a transmitting time domain resource, a transmitting mode resource, a receiving beam resource, a receiving antenna resource, a receiving port resource, a receiving frequency domain resource, a receiving sequence resource, a receiving time domain resource, or a receiving mode resource. The port resource is a reference signal port resource.

In an embodiment of the present disclosure, X resources with optimal channel quality are the X resources having best channel quality.

Specifically, for example, a resource is composed of a transmitting beam and a receiving beam. In a case of eight transmitting beams and four receiving beams, there are 8*4 transmitting-receiving beam pairs. That is, the candidate resource set is composed of eight transmitting-receiving beam pairs. The channel quality of those transmitting-receiving beam pairs forms an 8*4 matrix (or similar to a 4*8 matrix), where an element in i-th row and j-th column represents the channel quality of an i-th transmitting beam to a j-th receiving beam. Specifically, it is assumed that the matrix is as shown in Table 1, where the channel quality may be a RSRP of a transmitting beam to a receiving beam.

TABLE 1

| Transmitting Beam | Receiving Beam | | | |
|---|---|---|---|---|
| | 0 | 1 | 2 | 3 |
| 0 | 9.57 | 4.21 | 6.79 | 2.76 |
| 1 | 9.64 | 9.16 | 7.58 | 0.46 |
| 2 | 1.57 | 7.92 | 7.43 | 0.97 |
| 3 | 9.70 | 9.59 | 3.92 | 8.23 |
| 4 | 9.57 | 6.56 | 6.56 | 6.94 |
| 5 | 4.85 | 0.35 | 1.71 | 3.17 |
| 6 | 8.00 | 8.49 | 7.06 | 9.50 |
| 7 | 1.42 | 9.34 | 0.31 | 0.34 |

Now, M transmitting-receiving beam pairs are selected from the 8*4 transmitting-receiving beam pairs, and information corresponding to the selected transmitting beam pairs is fed back to the base station.

The selection criterion for selecting the M transmitting-receiving beam pairs may include one of following criteria.

Selection criterion 1: the selected M resources (hereinafter, a transmitting-receiving beam pair is referred to as a resource), and the M resources are resources with optimal channel quality of those 8*4 resources, so the selected M resources may have different resources corresponding to a same transmitting resource, or may have different resources corresponding to a same receiving resource. In conclusion, the number of transmitting resources included in the M resources now is less than or equal to M, and/or the number of receiving resources included in the M resources is less than or equal to M. Specifically, as shown in Table 1, it is assumed that M=4, now four resources of {(3, 0), (1, 0), (3, 1), (0, 0)} or {(3, 0), (1, 0), (3, 1), (4, 0)} are selected, since (0, 0) and (4, 0) correspond to the same channel quality, where (x, y) represents a resource composed of (transmitting beam x, receiving beam y).

Selection criterion 2: X1 resources are selected from the M resources first. For example, X1 resources with optimal channel quality are selected to obtain R1 receiving resources corresponding to these X1 resources, and M resources with optimal channel quality are selected for these R1 receiving resources. The selection of M resources with the optimal quality from the R1 receiving resources is specifically as shown in Table 1. It is assumed that X1=3, resources of {(3, 0), (1, 0), (3, 1)} are obtained, and then M resources are selected for R1 receiving resources {0,1} corresponding to the X1 resources, for example, M=5. M resources with the optimal channel quality may be selected from the R1 receiving resources, so that resources of {(3, 0), (1, 0), (3, 1), (0, 0), (4, 0)} are obtained at this point. The number of transmitting beams and the number of receiving beams corresponding to the M resources are less than M at this moment.

It may be agreed that X1 is equal to 1, that is, a resource with optimal channel quality is selected, and then M resources with optimal channel quality under a receiving resource of this resource are selected. As shown in Table 1, a resource of (3, 0) is selected first, and then M transmitting beams with optimal channel quality corresponding to receiving beam 0 are selected to obtain a transmitting beam set of {3, 1, 0, 4}.

Selection criterion 3: R1 receiving beams are selected first, a quality sum of each transmitting beam in the R1 receiving beams is obtained, and M resources with an optimal quality sum are selected.

Specifically, for example, a combination of receiving beams {0, 1} is selected first. At this time, a sum of receiving quality of the R1 receiving resources is obtained for each transmitting resource, and then M transmitting resources with an optimal sum of receiving quality are selected. R1 may be less than or equal to the number of panels or TXRUs of the terminal, so that Table 2 is obtained. Now, a selected transmitting beam set is {3, 1, 6, 4, 0}, and further a receiving beam set corresponding to these transmitting resources is {0, 1}. The selected M resources include M different transmitting beams, and the number of receiving beams is less than M at this time.

TABLE 2

| Transmitting Beam | Combination of Receiving Beams (0, 1) |
| --- | --- |
| 0 | 13.78 |
| 1 | 18.80 |
| 2 | 9.49 |
| 3 | 19.29 |
| 4 | 16.13 |
| 5 | 5.20 |
| 6 | 16.49 |
| 7 | 10.76 |

Selection criterion 4: X resources with optimal channel quality are selected from the candidate resource set to obtain R2 receiving resources corresponding to the X resources with the optimal channel quality; one or more transmitting resources with optimal channel quality are selected for each of the R2 receiving resource, so as to form the M resources. The selection criterion 4 is similar to selection criterion 2, and the difference is that M1 transmitting resources with the optimal channel quality are selected for each of the obtained R2 receiving resource, and the R2*M1 transmitting resources form M transmitting resources. In this embodiment, an equal number of M1 of transmitting resources are selected for each of the R2 receiving resources, and this embodiment does not exclude an unequal number of transmitting beams selected for each of the R2 receiving beams. Specifically, as shown in Table 1, it is assumed that X1=3, resources of {(3, 0), (1, 0), (3, 1)} are obtained, and then M resources are selected for R1 receiving resources of {0, 1} corresponding to the X1 resources, such as M=4, M1=2, and selected resources are {transmitting beam 3, transmitting beam 1} corresponding to receiving beam 0, and {transmitting beam 3, transmitting beam 7} corresponding to receiving beam 1.

Selection criterion 5: an optimal receiving resource is selected for each transmitting resource in the candidate resource set, so as to obtain T resources; and M resources with optimal channel quality are selected from the T resources. T is the number of transmitting resources. Specifically, as shown in Table 1, the T resources shown in Table 3 are obtained. Then M transmitting beams are selected to obtain selected combinations of transmitting beams and receiving beams of {(3, 0), (1, 0), (0, 0), (4, 0)}. At this time, the selected receiving beams are the same. However, it is not excluded that the selected transmitting beams may correspond to different receiving beams in other embodiments of Table 1.

TABLE 3

| Transmitting Beam | (Channel Quality, Receiving Beam) |
| --- | --- |
| 0 | (9.57, 0) |
| 1 | (9.64, 0) |
| 2 | (7.92, 1) |
| 3 | (9.70, 0) |
| 4 | (9.57, 0) |
| 5 | (4.85, 0) |
| 6 | (9.50, 3) |
| 7 | (9.34, 1) |

Selection criterion 6: an optimal transmitting resource is selected for each receiving resource in the candidate resource set, so as to obtain R resources; M resources with optimal channel quality are selected from the R resources. For example, a result shown in Table 4 is obtained based on Table 1, and a selected set of (transmitting beam, receiving beam) is {(3, 0), (3, 1), (1, 2), (6, 3)}.

TABLE 4

| Receiving Beam | (Channel Quality, Transmitting Beam) |
|---|---|
| 0 | (9.70, 3) |
| 1 | (9.70, 3) |
| 2 | (7.58, 1) |
| 3 | (9.50, 6) |

The above-mentioned selected resources are reported in two manners. In a manner, the terminal reports transmitting beam index and receiving beam index of each selected resource to the base station. In another manner, the terminal only reports the transmitting beam index, and the base station obtains a receiving beam condition based on a selection criterion used by the terminal. Specifically, when the terminal uses selection criterion 1, the base station assumes that a transmitting beam reported by the terminal may be received on multiple receiving beams. For selection criterion 1, the terminal at this time may further report the number of receiving beams corresponding to each transmitting beam in the selected M resources. Specifically, as described above, transmitting-receiving beam pairs of {(3, 0), (1, 0), (3, 1), (0, 0)} are selected based on the selection criterion 1, and the reported information includes {(transmitting beam 3, two receiving beams), (transmitting beam 1, one receiving beam), (transmitting beam 0, one receiving beam)}.

Selection criterion 7: a resource with optimal channel quality is selected first, then the channel quality of resources in a row corresponding to the transmitting resource of the selected resource and the channel quality of resources in a column corresponding to the receiving resource of the selected resource are all set to 0; a next resource with optimal channel quality is selected to be a selected second resource, then the channel quality of resources in a row corresponding to the transmitting resource of the second selected resource and the channel quality of resources in a column corresponding to the receiving resource of the second selected resource are all set to 0; and then a third resource with optimal channel quality is selected, and so on. Specifically referring to Table 1, after an optimal resource of (3, 0) is selected, a row corresponding to transmitting beam 3 is set to 0, and a column corresponding to receiving beam 0 is set to 0, so a Table 4-1 is obtained. Then a second resource of (6, 3) with optimal channel quality is selected from this Table 4-1. After the second resource is selected, a row corresponding to transmitting beam 6 and a column corresponding to receiving beam 3 are set to 0 to obtain a table shown in Table 4-2. Then a resource of (7, 1) is selected, and a row corresponding to transmitting beam 7 and a column corresponding to receiving beam 1 are set to 0 to obtain Table 4-3. Then a resource of (1, 2) is selected. In conclusion, at this time selected resources are {(3, 0), (6, 3), (7, 1), (1, 2)}. It can be seen that M is less than or equal to min(the number of transmitting beams, the number of receiving beams). At this time, M resources include M different transmitting beams and M different receiving beams.

TABLE 4-1

| Transmitting Beam | Receiving Beam | | | |
|---|---|---|---|---|
| | 0 | 1 | 2 | 3 |
| 0 | 0 | 4.21 | 6.79 | 2.76 |
| 1 | 0 | 9.16 | 7.58 | 0.46 |
| 2 | 0 | 7.92 | 7.43 | 0.97 |
| 3 | 0 | 0 | 0 | 0 |
| 4 | 0 | 6.56 | 6.56 | 6.94 |
| 5 | 0 | 0.35 | 1.71 | 3.17 |
| 6 | 0 | 8.49 | 7.06 | 9.50 |
| 7 | 0 | 9.34 | 0.31 | 0.34 |

TABLE 4-2

| Transmitting Beam | Receiving Beam | | | |
|---|---|---|---|---|
| | 0 | 1 | 2 | 3 |
| 0 | 0 | 4.21 | 6.79 | 0 |
| 1 | 0 | 9.16 | 7.58 | 0 |
| 2 | 0 | 7.92 | 7.43 | 0 |
| 3 | 0 | 0 | 0 | 0 |
| 4 | 0 | 6.56 | 6.56 | 0 |
| 5 | 0 | 0.35 | 1.71 | 0 |
| 6 | 0 | 0 | 0 | 0 |
| 7 | 0 | 9.34 | 0.31 | 0 |

TABLE 4-3

| Transmitting Beam | Receiving Beam | | | |
|---|---|---|---|---|
| | 0 | 1 | 2 | 3 |
| 0 | 0 | 0 | 6.79 | 0 |
| 1 | 0 | 0 | 7.58 | 0 |
| 2 | 0 | 0 | 7.43 | 0 |
| 3 | 0 | 0 | 0 | 0 |
| 4 | 0 | 0 | 6.56 | 0 |
| 5 | 0 | 0 | 1.71 | 0 |
| 6 | 0 | 0 | 0 | 0 |
| 7 | 0 | 0 | 0 | 0 |

Selection criterion 8: the M resources are resources with worst channel quality in the candidate resource set.

Figure 3:
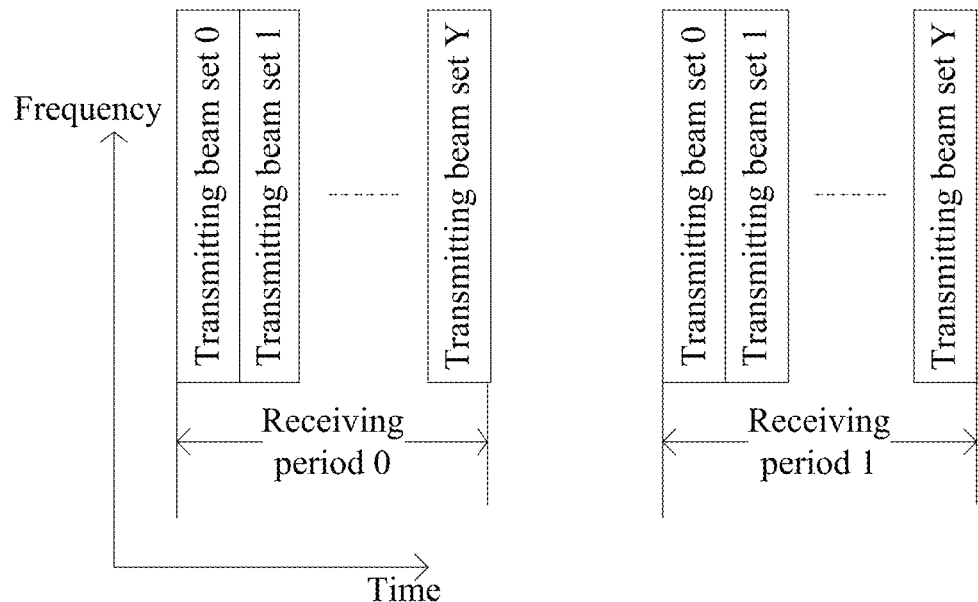
FIG. 3 is a schematic diagram of using receiving time to represent a receiving resource according to an embodiment of the present disclosure.

In the examples described above, a transmitting beam may be equivalent to a transmitting resource, and a receiving beam may be equivalent to a receiving resource. When a transmitting resource represents a measurement reference signal port, the transmitting resource may be one of: a measurement reference signal port, a group of measurement reference signal ports, a measurement reference signal resource, or a group of measurement reference signal resources. A receiving resource may be a receiving period or receiving time, as shown in FIG. 3. Different receiving resources are represented through different receiving time. In a first receiving period, the transmitting beam is switched and the receiving beam is unchanged, the terminal receives. In a first receiving mode, signals transmitted by the base station on the transmitting resource; and in a second receiving period, the terminal receives, in a second receiving mode, signals transmitted by the base station on the transmitting resource. Receiving manners corresponding to different receiving modes are time divisional, i.e., the terminal may only receive signals in a receiving manner corresponding to one receiving mode at a time. At this time, a receiving resource includes a receiving beam set, and the receiving beam set includes one or more receiving beams.

When a transmitting resource consists of multiple transmitting ports (or transmitting antennas) and a receiving resource consists of multiple receiving ports (or receiving antennas), a resource may be equivalent to an MIMO channel in the form of Rx*Tx matrix, where Rx represents the number of receiving ports and Tx represents the number of transmitting ports. Some characteristics of the MIMO channel may be used for indicating the channel quality, such as a square of maximum eigenvalue of the equivalent MIMO channel, a square sum of eigenvalues of the equivalent MIMO channel, a channel capacity of the equivalent MIMO channel. Alternatively, the channel quality is characterized by a rank of the equivalent MIMO channel at this time, and the channel quality is better when the rank is larger; or the channel quality is jointly characterized by an eigenvalue and the rank of the equivalent MIMO channel. Alternatively, a reciprocal of condition number of the equivalent MIMO channel is used for characterizing the channel quality.

The channel quality in this embodiment may also be a CQI.

The fed back channel state information may include at least one of: a reference signal receiving power (RSRP), channel quality indication information (such as a CQI or other channel quality measurement information), a precoding matrix indication (PMI), or a rank indication (RI).

Of course, the selection criterion may also include other criteria other than criteria described in this embodiment. In short, the selection criterion of the terminal is determined in several manners at this time.

Manner 1: The selection criterion is agreed with the base station.

Manner 2: A selection criterion set is agreed with the base station, and the selection criterion is determined by the terminal itself. In an embodiment, the indication information of the M resources reported by the terminal further includes indication information of the selection criterion The M resources are selected by the terminal based on the indicated selection criterion.

Manner 3: The base station configures a selection criterion for the terminal through the indication information.

Manner 4: The base station configures a selection criterion set for the terminal through the indication information, and the terminal itself determines the selection criterion. In an embodiment, the indication information of the M resources reported by the terminal further includes the indication information of the selection criterion. The M resources are selected by the terminal based on the indicated selection criterion.

Embodiment 2

When channel quality corresponding to a resource is fed back by the terminal, the base station needs to assume which receiving condition is used by the terminal for obtaining the channel state information, or the base station notifies the terminal through the indication information that under which receiving condition the terminal may obtain the channel state information.

For example, the terminal has three panels, and each panel has two TXRUs corresponding to a polarization direction. In other words, one polarization direction corresponds to 2*3=6 TXRUs and two polarization direction correspond to 2*6=12 TXRUs. A panel represents an antenna oscillator matrix. In general, the oscillators in each panel are uniformly distributed. The oscillators in each panel may correspond to one or more TXRUs using different virtualization methods, one of the TXRUs has its own independent ADC/DAC unit (however, two dual-polarized TXRUs may share an ADC/DAC, i.e., a radio frequency beam forming unit).

Figure 4A:
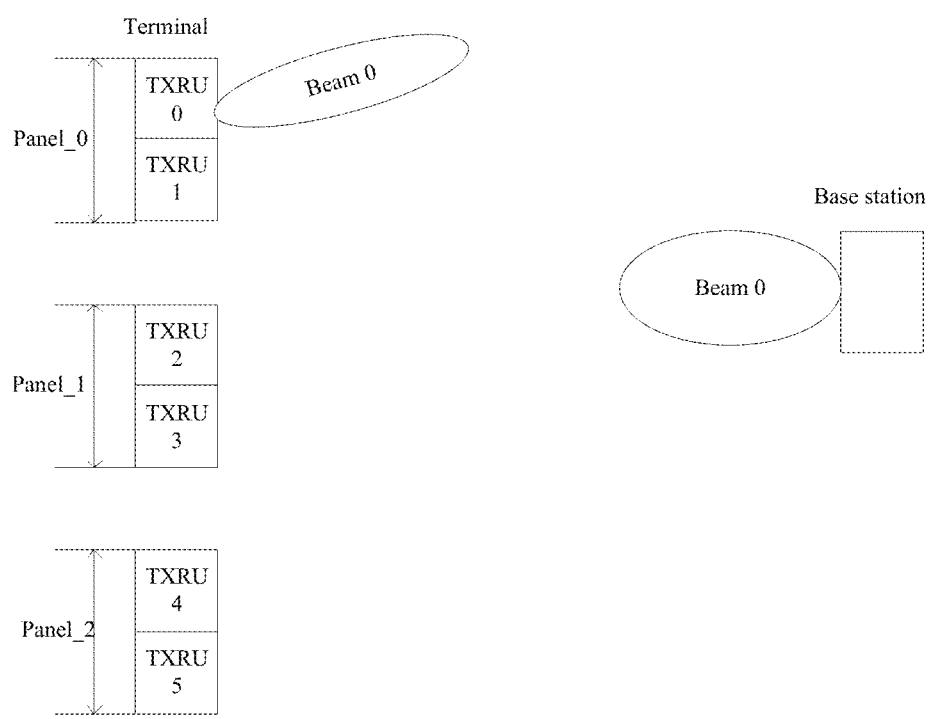
FIGS. 4a-4e are schematic diagrams of different receiving conditions of a terminal according to an embodiment of the present disclosure.
Figure 4B:
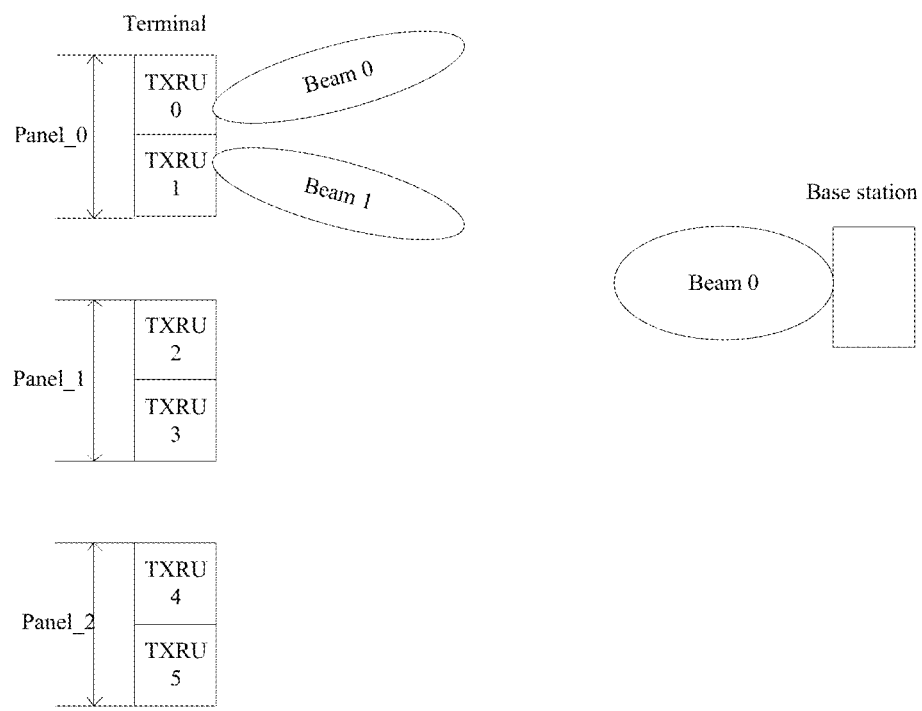
Figure 4C:
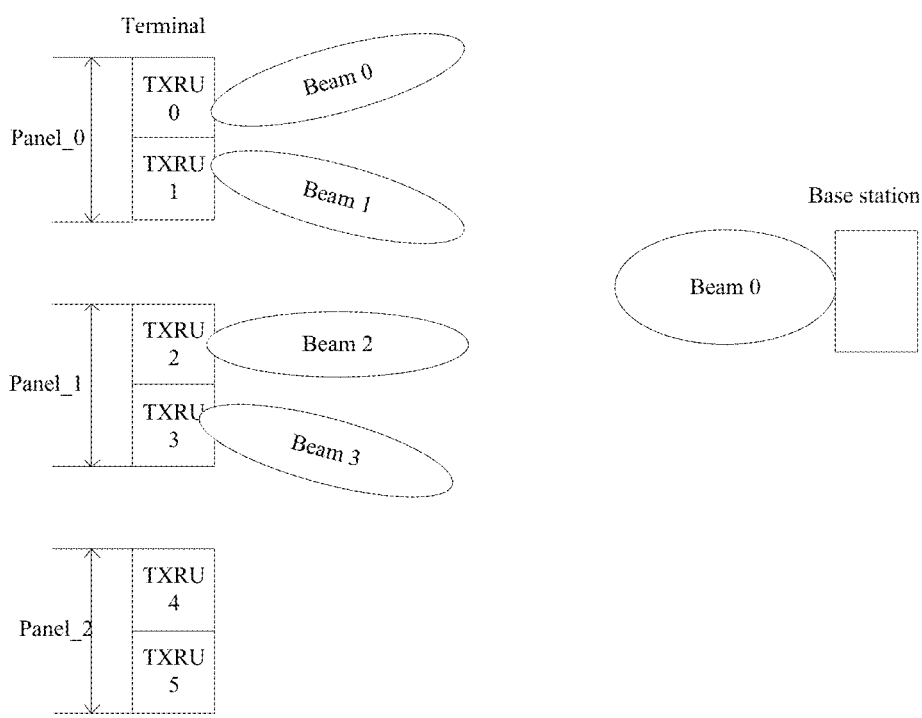
Figure 4D:
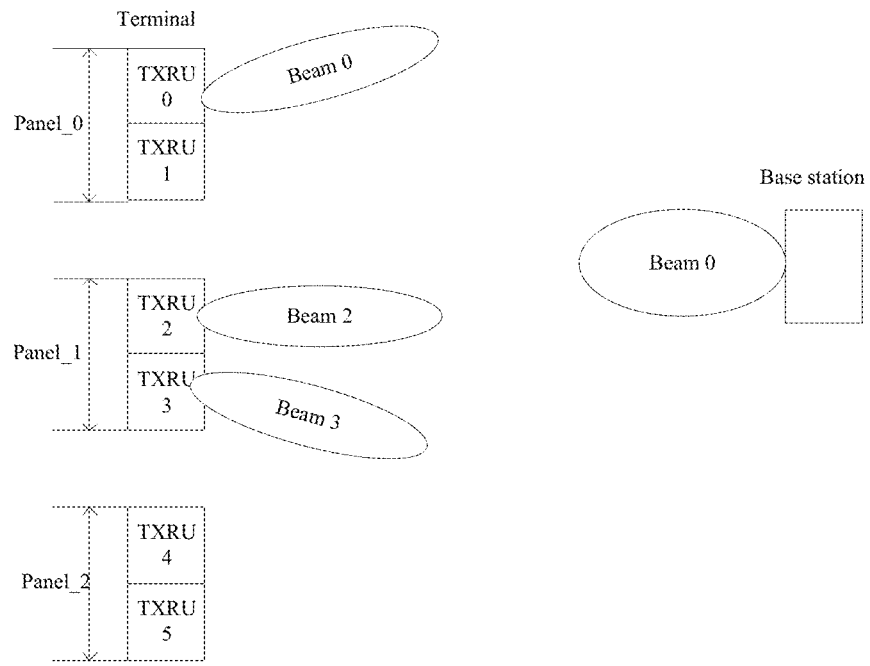
Figure 4E:
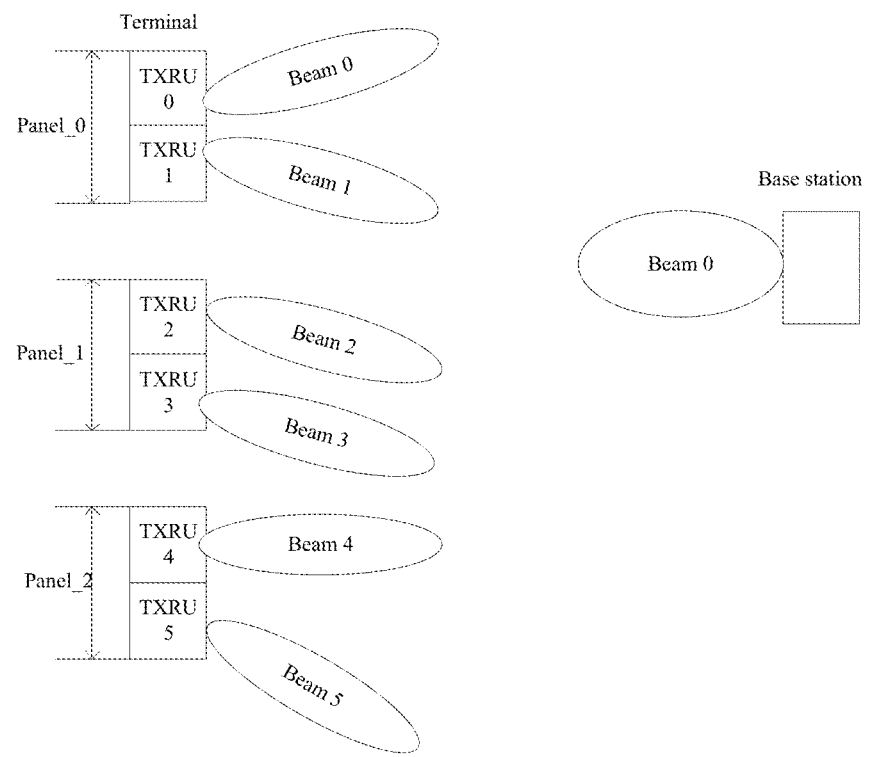

For signals transmitted by the base station on a transmitting resource, the terminal will report receiving quality, which corresponds to several receiving conditions of the terminal as follows:

receiving condition 1: the channel quality is obtained by the terminal using only one receiving beam of a TXRU, or two TXRUs in two polarization directions at this point, as shown in FIG. 4a;

receiving condition 2: the channel quality is obtained by the terminal using all TXRUs in one panel, those TXRUs may be single-polarized or dual-polarized at this point, as shown in FIG. 4b;

receiving condition 3: the channel quality is obtained using only part of the panels, and all TXRUs in each of the part of panels are used, those TXRUs may be single-polarized or dual-polarized, as shown in FIG. 4c;

receiving condition 4: the channel quality is obtained using only part of the panels, and all or part of TXRUs in each of the part of panels are used, those TXRUs may be single-polarized or dual-polarized, as shown in FIG. 4d;

receiving condition 5: the channel quality is obtained by the terminal based on using all TXRUs of all panels, as shown in FIG. 4e.

In FIGS. 4a to 4e, beams used by different TXRUs may be in a same direction or in different directions. At this time, different TXRUs correspond to radio frequency beams at different horizontal angles and/or vertical angles. This embodiment does not exclude a same radio frequency beam corresponding to different TXRUs. Or, the base station indicates that different TXRUs of the terminal should use a same radio frequency beam to obtain channel quality corresponding to a transmitting resource, or that different TXRUs are allowed to use different radio frequency beams to obtain the channel quality corresponding to the transmitting resource, i.e., the radio frequency beams used by the different TXRUs may be the same or different at this time. Alternatively, the terminal is configured by that base station to use different TXRUs with different radio frequency beams to obtain the channel quality corresponding to the transmitting beam.

If the base station assumes that the channel quality reported by the terminal is based on the condition 3, the selection criterion for the terminal to select M resources from the candidate resource set may include traversing all beam combinations of TXRUs to obtain the channel quality. At this time, according to the number of TXRUs received by the receiving end, each TXRU may hit one radio frequency beam in only one direction at each moment. It is assumed that TXRU_num is the number of TXRUs at the receiving end, Rx_Beam is the number of radio frequency beams corresponding to one TXRU. If each TXRU corresponds to four radio frequency beams (and radio frequency beams used in different polarization directions are the same), the total number of receiving modes is RxBeamMode_Num= $(TXRU\_num)^{RX\_Beam}=12^4$. An equivalent channel is formed by one receiving mode and one transmitting resource. Similar to Table 1 in the embodiment 1, the number of transmitting resources*RxBeamMode_Num matrix is formed. The element in i-th row and j-th column is used for characterizing channel quality of an equivalent channel formed by an i-th transmitting resource and a j-th receiving mode. After this equivalent matrix is obtained, M resources may be selected based on one or more selection criteria in the embodiment 1.

Specifically, Table 1 is taken as an example. It is assumed that channel quality in Table 1 is obtained based on a receiving condition of the terminal in FIG. 4a, and that a same receiving beam has same channel quality for different TXRUs. For the sake of simplicity, it is assumed that the terminal has only one panel and one polarization direction corresponds only two TXRUs on each panel, situations of transmitting beam and receiving mode are shown in Table 5 (where the receiving mode corresponds to a receiving beam set and thus corresponds to receiving beams on two respective receiving TXRUs).

TABLE 5

| Transmitting Beam Receiving Beam Set | (0, 1) | (0, 2) | (0, 3) | (1, 2) | (1, 3) | (1, 4) |
|---|---|---|---|---|---|---|
| 0 | 13.78 | 16.36 | 12.33 | 11 | 6.97 | 9.55 |
| 1 | 18.80 | 17.22 | 10.10 | 16.74 | 9.62 | 8.04 |
| 2 | 9.49 | 9 | 2.54 | 15.35 | 8.89 | 8.40 |
| 3 | 19.29 | 13.62 | 17.93 | 13.51 | 17.82 | 12.15 |
| 4 | 16.13 | 16.13 | 16.51 | 13.12 | 13.50 | 13.50 |
| 5 | 5.20 | 6.56 | 8.02 | 2.06 | 3.52 | 4.88 |
| 6 | 16.49 | 15.06 | 17.50 | 15.55 | 17.99 | 16.56 |
| 7 | 10.76 | 1.73 | 1.76 | 9.65 | 9.68 | 0.65 |

In an embodiment, now a sum of receiving energy of all transmitting beams in each receiving mode may be obtained, and then an appropriate receiving mode is selected. Specifically, as shown in Table 5, an energy sum of each column is obtained, and then an appropriate column is selected to be the appropriate receiving mode.

There are several manners for deciding which of receiving condition 1 to receiving condition 5 (the receiving condition set in here is only an example, this embodiment does not exclude other receiving condition sets) should be used by the terminal according to channel quality or channel state information of a transmitting resource fed back by the terminal. In a first manner, the receiving condition (i.e. a receiving state) of the terminal is agreed through bidirectional transmission; in a second manner, the terminal freely decides the receiving condition; in a third manner, the base station notifies the terminal of the receiving condition; and in a fourth manner, the base station and the terminal agree on a receiving condition set that the terminal may use, and the terminal decides a specific receiving condition itself for use. In an embodiment, the terminal may feed back the selected receiving condition to the base station.

Of course, this embodiment does not exclude other receiving conditions. The channel state information may include one or more of following information: a reference signal reception power (RSRP), channel quality indication information (such as a CQI or other channel quality measurement information), a precoding matrix indication (PMI), and a rank indication (RI). After the base station obtains the receiving state of the terminal corresponding to these channel states, the base station may provide assistance for candidate scheduling or beam training. For example, when a CQI fed back by the terminal is based on a single receiving beam, if the base station schedules the terminal to use multiple receiving antennas for receiving signals, a schedulable MCS may be increased to a certain extent in comparison with the case of CQI.

Embodiment 3

According to the determination of M in this embodiment, a value of M may be obtained in at least one of following manners.

Manner 1: The value of M is obtained through receiving indication information of the base station. The indication information includes the value of M.

Manner 2: The base station transmits indication information or agrees on a channel quality threshold, so the number of resources with channel quality greater than the channel quality threshold forms the M. At this time, the value of M may be different at different measurement moments, and a maximum value of M may be further defined.

Manner 3: The base station notifies the maximum value M_Max of M through a signaling or agrees on the maximum value M_Max of M, and the terminal decides the value of M according the receiving condition of the terminal.

Manner 4: The base station notifies the number of receiving resources through a signaling or agrees on the number of receiving resources, and the terminal selects a selection criterion according to the embodiment 1 or embodiment 2 to form the value of M by the number of selected resources.

Manner 5: The base station and the terminal agree that the value of M is equal to the number of resources included in the candidate resource set.

Manner 6: The base station and the terminal agree that the value of M is obtained according the number of TXRUs corresponding to the terminal.

Manner 7: The base station and the terminal agree that the value of M is obtained according the number of panels corresponding to the terminal.

Embodiment 4

The terminal selects M resources in the candidate resource set according to a certain selection criterion. In this embodiment, the terminal reports the value of M to the base station.

For example, resources are selected according to an agreed threshold of channel quality, and the terminal obtains that channel quality of all resources is less than the agreed threshold, that is M=0, the terminal reports the value of M. M corresponding to different report moments may be different, and it is agreed that M is less than or equal to M_Max, where M_Max is a maximum value of the number of the selected resources.

Embodiment 5

In this embodiment, the terminal reports a piece of resource quantity information M3, where the resource quantity information M3 may not be equal to M, and M represents the number of the selected resources.

For example, resources are selected based on whether channel quality corresponding to the resources is greater than a predetermined threshold. At this time, M3 represents the number of resources with channel quality greater than the predetermined threshold, and a reported number of resources is the number of M resources with optimal channel quality. For example, the number of resources with channel quality greater than the predetermined threshold is large, while the maximum value M_Max of the reported number of resources is relatively small, where M3 corresponds to the number of resources with the channel quality greater than the predetermined threshold and the reported number of resources is M.

Alternatively, the number M3 of resources with channel quality greater than the predetermined threshold in all candidate resources is 0, and the reported resources are M resources with optimal channel quality.

M is an integer less than or equal to M_Max, and M3 is less than or equal to the number of resources included in the candidate resource set.

Embodiment 6

In this embodiment, the terminal reports a channel quality ordering of all resources in the candidate resource set and/or the channel quality information of the selected M resources.

For example, the number of resources in the candidate resource set is M_H, and an arrangement is obtained for the M_H resources. Resources in the arrangement are sorted according to the channel quality of the resources. For example, when M_H=6 and M=2, feedback information of the terminal and the base station includes at least one of following information: (5, 3, 1, 0, 4, 2); or channel quality information corresponding to resource 5 and resource 3.

(5, 3, 1, 0, 4, 2) indicates channel quality of resource 5≥channel quality of resource 3≥channel quality of resource 1≥channel quality of resource 0≥channel quality of resource 4≥channel quality of resource 2. Specific channel quality information corresponding to the resource 5 and resource 3 with the optimal channel quality is reported.

Embodiment 7

In this embodiment, R receiving resources corresponding to the selected M resources are obtained, and a channel quality ordering of all transmitting resources included in the M resources for each of the R receiving resources is obtained and fed back to the base station. Alternatively, an ordering of all transmitting resources included in the M resources is fed back for a receiving resource with optimal channel quality of all receiving resources, where the ordering of the transmitting resources is sorted according to channel quality.

As shown in Table 6, the candidate resource set includes 32 resources. For 8 transmitting resources and 4 receiving resources, each element in Table 6 represents channel quality from a corresponding transmitting resource to a corresponding receiving resource. The transmitting resource may be a transmitting beam, and the receiving resource may be a receiving beam. Resources with optimal channel quality are selected by the terminal first to obtain selected resources {(0, 3), (6, 0), (3, 0), (3, 1)}, where (x, y) represents (transmitting beam x, receiving beam y), and the terminal may report index information of the selected resources and channel quality information of the selected resources to the base station. It is also possible to report following information: the receiving quality ordering of transmitting resources of {0, 6, 3} in receiving beams of {3, 0, 1}. A transmitting resource with better channel quality will rank higher in the ordering. For example, {3, 0, 1} in receiving beam 3 has an ordering of {0, 6, 3}. The higher place in the ordering the corresponding transmitting beam is, the better the channel quality of the corresponding transmitting beam has for the corresponding receiving beam. Of course, this embodiment does not exclude less channel quality with a higher place of the corresponding receiving beam.

TABLE 6

| Transmitting Beam | Receiving Beam | | | |
|---|---|---|---|---|
| | 0 | 1 | 2 | 3 |
| 0 | 1.38 | 2.19 | 3.54 | 4.79 |
| 1 | 0.23 | 1.90 | 3.77 | 1.70 |
| 2 | 0.49 | 3.82 | 1.38 | 2.92 |
| 3 | 4.12 | 3.97 | 3.39 | 1.11 |
| 4 | 3.47 | 0.93 | 3.27 | 3.75 |
| 5 | 1.58 | 2.44 | 0.81 | 1.27 |

TABLE 6-continued

| Transmitting Beam | Receiving Beam | | | |
|---|---|---|---|---|
| | 0 | 1 | 2 | 3 |
| 6 | 4.75 | 2.22 | 0.59 | 2.52 |
| 7 | 0.17 | 3.23 | 2.49 | 3.49 |

That is, the feedback information from the terminal to the base station at this time includes at least one of following information: the channel state information of the selected M resources, or the ordering of all transmitting resources corresponding to the M resources for each receiving resource.

Specifically, this embodiment includes the channel quality of 4 selected resources, i.e., the {(0, 3), (6, 0), (3, 0), (3, 1)}. Three orderings {0, 6, 3}, {6, 3, 0}, {3, 6, 0} represent channel quality orderings for receiving beams of {3, 0, 1} respectively. In this embodiment, only the ordering {0, 6, 3} is reported, which indicates an ordering of these transmitting beams for the receiving beam 3 (i.e., the receiving beam with optimal channel quality).

Embodiment 8

In this embodiment, the terminal feeds back the number of receiving resources corresponding to transmitting resources to the base station.

In an embodiment, the number of receiving resources corresponding to the transmitting resources indicates the number of receiving resources capable of seeing the transmitting resources of all receiving resources in the candidate resource set, or the number of receiving resources capable of seeing the transmitting resources among all receiving resources corresponding to the selected resources. In an embodiment, if a transmitting resource can be seen by a receiving resource, the channel quality of the transmitting resource to the receiving resource needs to exceed a predetermined threshold. This information may assist the base station in determining transmission information in a subsequent signal transmitting phase, transmission information includes at least one of following information: the number of time division resources required to transmit a transmitting resource, the number of reference signal ports, a precoding polling period, or the number of precoding resource units. The number of precoding units represents the number of different precoding in precoding cycling. The transmission information of the signals is determined in following manners: one manner is to obtain the number of time division resources in a beam measurement phase according to the number of receiving resources fed back by the terminal; and the other manner is to obtain the number of time division resources in a next beam measurement phase according to the number of receiving resources fed back by the terminal and the number of receiving antennas of the terminal.

Specifically, for example, a transmitting resource is a transmitting beam, and a receiving resource is a receiving beam. There are 8 transmitting beams and 4 receiving beams, and thus 8*4 resources in total. Channel quality corresponding to these resources is shown in Table 7. The terminal selects {(3, 0), (1, 0), (3, 1), (0, 0)} based on the selection criterion. Among the selected resources, there are two receiving resources, there are two receiving beams for the transmitting beam 3, and there is one receiving beam for the transmitting beams of {0, 1}.

TABLE 7

| Transmitting Beam | Receiving Beam | | | |
|---|---|---|---|---|
| | 0 | 1 | 2 | 3 |
| 0 | 9.57 | 4.21 | 6.79 | 2.76 |
| 1 | 9.64 | 9.16 | 7.58 | 0.46 |
| 2 | 1.57 | 7.92 | 7.43 | 0.97 |
| 3 | 9.70 | 9.59 | 3.92 | 8.23 |
| 4 | 9.57 | 6.56 | 6.56 | 6.94 |
| 5 | 4.85 | 0.35 | 1.71 | 3.17 |
| 6 | 8.00 | 8.49 | 7.06 | 9.50 |
| 7 | 1.42 | 9.34 | 0.31 | 0.34 |

In a manner of reporting the number of receiving resources, the terminal feeds back the total number of receiving resources included in the selected resources to the base station. At this point, the base station may use this information to determine, for signals transmitted to the terminal subsequently, at least one of following information: the number of time division resources occupied by the signals, the number of DMRS ports of the signals, the number of polling codewords in precoding cycling of the signals, or a polling period used in precoding cycling of the signals.

Figure 8C:
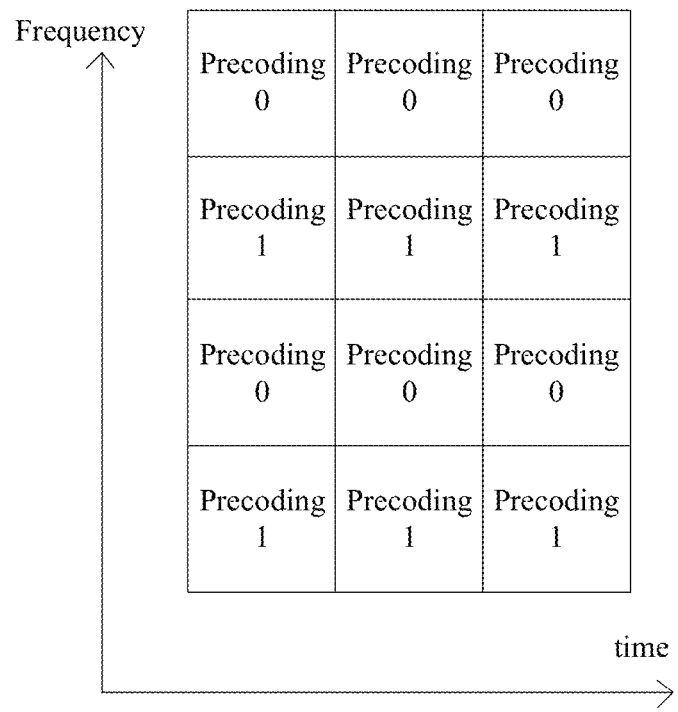
FIG. 8c is a schematic diagram illustrating determination of different precoding groups in precoding cycling according to the number of receiving resources according to an embodiment of the present disclosure.
Figure 8D:
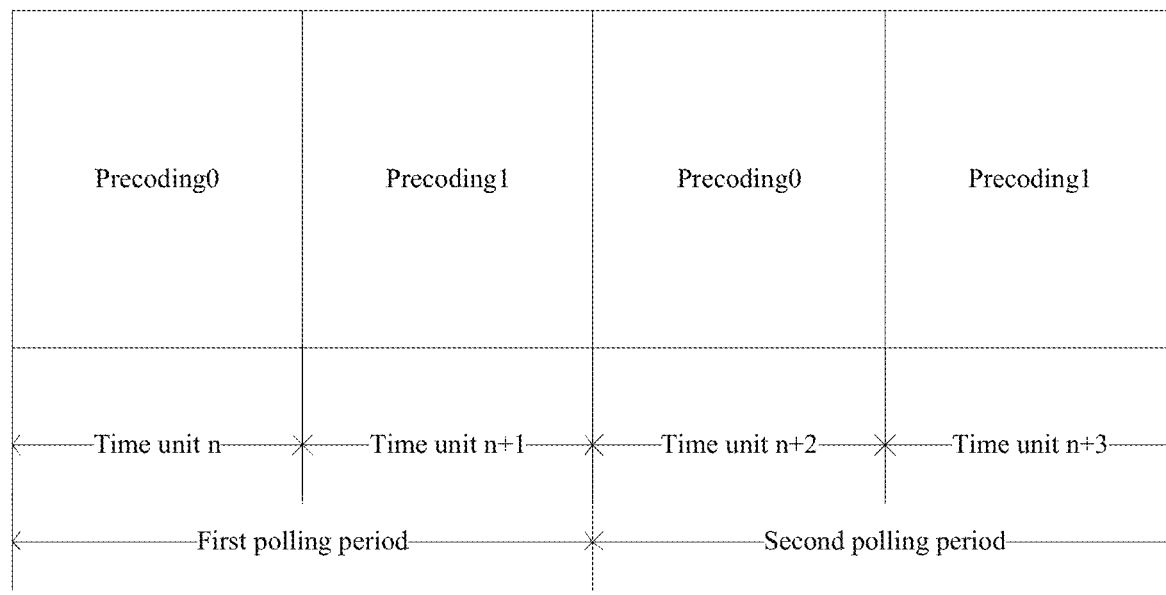
FIG. 8d is a schematic diagram illustrating determination of polling periods of different precoding groups in precoding cycling according to the number of receiving resources in an embodiment of the present disclosure.

Specifically, for example, if the number of receiving resources reported by the terminal is two, then in a subsequent communication phase, the base station may transmit time division resources with an integral multiple of two to the terminal, thereby allowing the receiving end to receive the signals using a corresponding receiving mode and which will increase link robustness. As shown in FIG. 8a, the base station may use two OFDM symbols to transmit a PDCCH to the terminal, and the terminal uses different receiving modes to receive the signals, which will increase the robustness of the link. Alternatively, as shown in FIG. 8b, the base station uses two time units to transmit the signals to the terminal. Alternatively if a receiving resource corresponds to a receiving beam and the terminal has more than one receiving antennas, at this point the base station may determine the number of DMRS ports transmitted to the terminal according to the number of receiving resources, for example, the number of DMRS ports is equal to an integral multiple of the number of receiving resources, or the number of DMRS ports is equal to min(the number of reported receiving resources, the number of receiving antennas of the terminal), especially the number of DMRS ports used for controlling channel demodulation is obtained according to above information. Or, the number of polling codewords or the polling period used in precoding cycling of the signals is determined according to the reported number of receiving resources, as shown in FIG. 8c or FIG. 8d. Each precoding represents a precoding group, including one or more precoding vectors, or one or more beams.

In another manner of the number of receiving resources, the terminal feeds back the number of receiving resources corresponding to each transmitting resource in the selected resources to the base station.

The signals in this embodiment include at least one of following signals: a data channel signal, a control channel signal, a measurement reference signal, or a demodulation reference signal.

Embodiment 9

In this embodiment, the terminal reports the number of receiving resources in a P-2 phase of the terminal corresponding to one receiving resource in a P-1 phase of the terminal to the base station. For example, the receiving beams are wide beams in the P-1 phase and narrow beams in the P-2 phase. At this time, a wide beam corresponds to a plurality of narrow beams, the terminal needs to transmit this information to the base station so as to facilitate beam training in the P-2 phase, especially receiving beam training.

A receiving beam may be equivalent to a receiving resource. The receiving resource includes at least one of following resources: a receiving beam resource, a receiving antenna resource, a receiving port resource, a receiving frequency domain resource, a receiving sequence resource, a receiving time domain resource, or a receiving mode resource, where the port resource refers to a reference signal port resource.

The number of receiving resources may be reported by the terminal through capability information, or the terminal may report according to its capability in different periods, i.e., the number is variable.

Embodiment 10

In this embodiment, the rank information is configured by the base station.

In an embodiment, the rank information is configured by the base station in at least one of following manners.

In a first manner, the rank information is configured by the base station when the candidate resource set is configured by the base station (for example, the candidate resource set includes CSI-RS resources).

In a second manner, the rank information is configured by the base station when a second set related to the candidate resource set is configured. The second set includes at least one of following sets: a RS resource set, a CSI report setting, a measurement set, or a link set, where a link includes a RS resource set and a CSI report setting set.

In a third manner, the rank information is configured in CSI process information.

In a fourth manner, the rank information may be configured directly in a dynamic signaling.

In a fifth manner, the candidate resource set includes N first sets, and a piece of rank information is configured in each first set, the rank information may be different for different first sets.

The rank information represents at least one of following information.

A. The rank information represents the maximum number of layers that the set or resource may support. Specifically, for example, the set is a CSI-RS resource. When the rank information is configured as 3, the rank information indicates that channel-related measurement information, such as channel throughput, may be obtained based on RI=1, 2, 3 according to this CSI-RS, a selected RI with a maximum channel throughput is obtained and the selected RI is reported to the base station. For example, RI=2 is selected, and then RI=2 is reported to the base station.

B. The rank information corresponding to the set is the number of layers supported by the set. Specifically, for example, the set is a CSI-RS resource. When the rank information corresponding to the CSI-RS resource is configured as three, which indicates that when a channel is measured based on this CSI-RS resource, channel related measurement information, such as throughput, may be obtained only based on RI=3.

In existing LTE, a maximum value of RI is obtained by the terminal based on min(the number of CSI-RS ports, the number of receiving antennas of the terminal). The value of RI fed back by the terminal to the base station is less than or equal to the maximum value of RI (hereinafter, the maximum value of RI is called RI_max in short). At present, in a condition of a beam-based transmission at high frequency, RI_max may not continue to be obtained according to the min(the number of CSI-RS ports, the number of receiving antennas of the terminal). Since different ports of the base station for transmitting CSI-RS may use a same beam, at this time the base station may instruct the terminal not to obtain the RI_max according to the min(the number of CSI-RS ports, the number of receiving antennas of the terminal). The rank information configured by the signaling indicates a corresponding RI_max supported by the set, and the RI (Rank Indication) reported by the terminal is less than or equal to the RI_max. Alternatively, the rank information indicates the number of layers supported by the set, and the terminal obtains CSI information based on the configured rank information and reports the CSI information to the base station.

In first implementation for configuring the rank information by the base station, the rank information is different for different sets, the rank information indicates the number of layers of each set, and then the terminal obtains the value of RI based on a plurality of sets and reports it to the base station.

Figure 9A:
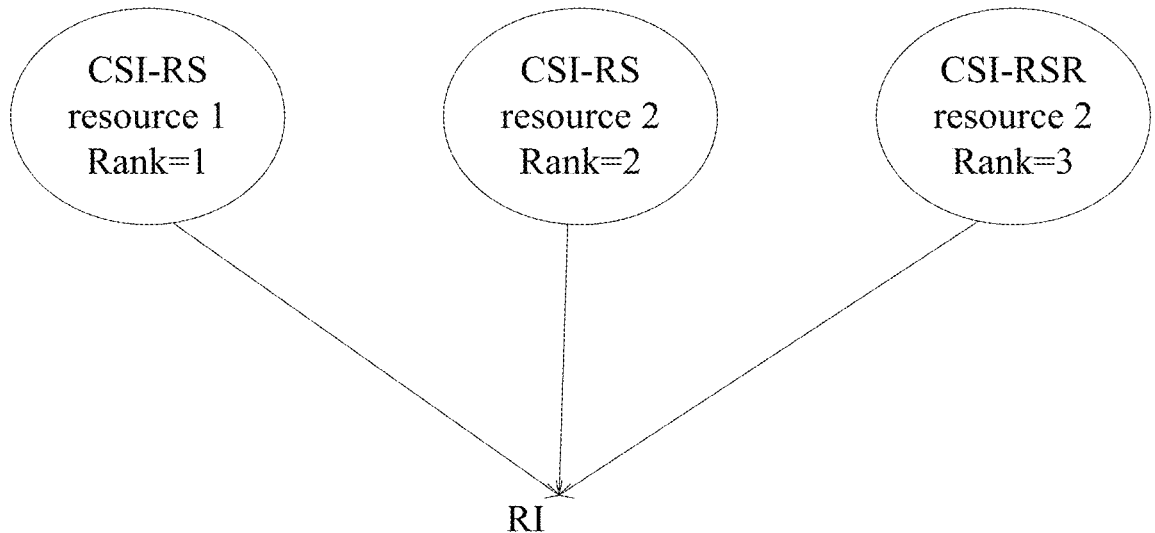
FIG. 9a is a schematic diagram illustrating obtaining of a value of RI through a terminal according to multiple CSI-RS resources carrying rank information.

Specifically, as shown in FIG. 9a, three CSI-RS resources are configured by the base station, and configuration information of respective CSI-RS resource includes corresponding rank information, which respectively corresponds to Rank=1, Rank=2, Rank=3. The terminal obtains channel throughput of these three CSI-RS resources based on the three CSI-RS resources and their corresponding rank values, and then the value of RI is selected according to a certain principle, such as maximizing channel throughput, and the value of RI is reported to the base station. Optionally the terminal implicitly reports the selected value of RI by reporting index information of the CSI-RS resource at this time.

Figure 9B:
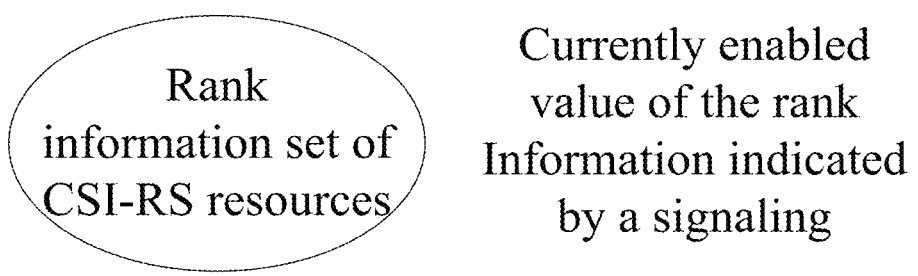
FIG. 9b is a schematic diagram one of rank information corresponding to a signaling configuration resource.

In second implementation for configuring the rank information by the base station, as shown in FIG. 9b, a rank information set is configured in first configuration information of a CSI-RS resource, the rank information set includes at least one rank, and then a currently enabled rank of the CSI-RS resource is configured in second configuration information of the CSI-RS resource. In an embodiment, the configuration of the first configuration information comes prior to the configuration of the second configuration information. The second configuration information only needs to be configured in a rank information set of the first configuration information, and/or In an embodiment a configuration period of the first configuration information is not less than a configuration period of the second configuration information.

Figure 9C:
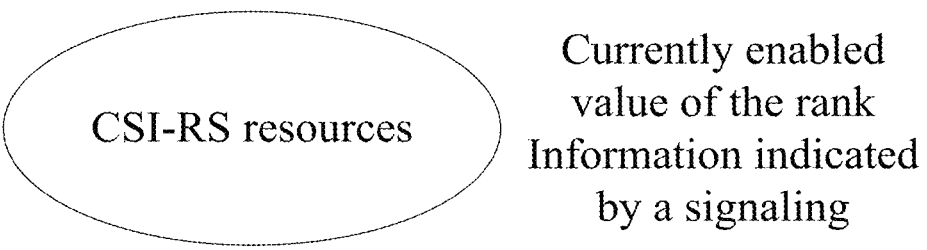
FIG. 9c is a schematic diagram two of rank information corresponding to a signaling configuration resource.

In third implementation for configuring the rank information, as shown in FIG. 9c, CSI-RS resources are configured in the first configuration information, and the rank information corresponding to the CSI-RS resources is directly configured in the second configuration information.

In this embodiment, the configuration information is notified in at least one of following manners: a RRC signaling, a MAC CE signaling, or a DCI signaling.

In above implementation, the rank information corresponding to a CSI-RS resource may be obtained based on all CSI-RS ports included in the CSI-RS resource, for example, the CSI-RS resource includes four CSI-RS ports, and a precoding matrix corresponding to the rank information has a size of (the number of CSI-RS ports)*RI. It is not excluded in this embodiment that, the rank information may be obtained based on part of CSI-RS ports included in the CSI-RS resource. For example, the CSI-RS resource includes four CSI-RS ports, and a precoding matrix corresponding to the rank information has a size of Tx1*RI, where Tx1 is less than or equal to 4.

In implementation, the rank information is a maximum rank value supported by the set, and correspondence exists between the maximum rank value and the number of CSI-RS ports used in the precoding matrix. For example, the CSI-RS resource includes eight CSI-RS ports. If a signaling indicates that the rank information corresponding to the CSI-RS resource is four, then the terminal is based on top four CSI-RS ports (or based on four CSI-RS ports obtained in other agreed manner, or through the signaling notification to obtain which four of the eight CSI-RS ports in the CSI-RS resource). Optionally, other CSI-RS ports in the CSI-RS resource are used as interference measurement signals. For clarity, that is, CSI—RS and CSI-IM are in a set this time, CSI-RS ports are obtained through the rank information and other ports are all used for CSI-IM ports. At this time, the CSI-RS resource may be referred to as a RS resource, including eight RS ports, and ports for the CSI-RS are determined according to the rank information configured by the RS resource, and the rest ports in the RS resource are used as CSI-IM ports.

Embodiment 11

In this embodiment, the terminal determines the dimension of a second feedback information according to non-zero elements in a first feedback information (or the number of elements in the first feedback information with an absolute value greater than the predetermined threshold), and/or determines the codebook restriction set of the second feedback information. For example, the precoding matrix fed back by the terminal may be expressed as:

$$w_{r,l} = BP_{r,l}C_{r,l} = \sum_{i=0}^{L-1} b_{k_1^{(i)}k_2^{(i)}} p_{r,l,i} c_{r,l,i} \quad r = 0, 1, l = 0, 1, \ldots, \text{Lay}-1 \qquad (1)$$

where r represents a polarization direction, l represents layer index, Lay represents a total number of layers, $b_{k_1^{(i)}k_2^{(i)}}$ represents a vector, which is a column vector with a dimension of (measurement reference signal ports)*1 in a single polarization direction, or a column vector with a dimension of (transmitting antennas)*1, $\{b_{k_1^{(i)}k_2^{(i)}}, i=0, 1, \ldots, L-1\}$ may be a vector set (similar to W1 in LTE) fed back by in a long period of the terminal. Of course, the $\{b_{k_1^{(i)}k_2^{(i)}}, i=0, 1, \ldots, L-1\}$ obtained by other ways is not excluded in this embodiment, $p_{r,l,i}$ represents an amplitude weight of $w_{r,l}$ for an i-th vector in the $\{b_{k_1^{(i)}k_2^{(i)}}, i=0, 1, \ldots, L-1\}$, $c_{r,l,i}$ represents a phase compensation of $w_{r,l}$ for an i-th vector in the $\{b_{k_1^{(i)}k_2^{(i)}}, i=0, 1, \ldots, L-1\}$. In an embodiment, $\{b_{k_1^{(i)}k_2^{(i)}}, i=0, 1, \ldots, L-1\}$ is fed back through a wideband in a long period of the terminal, P=$\{p_{r,l,i}, i=0, 1, \ldots, L-1\}$ and C=$\{c_{r,l,i}, i=0, 1, \ldots, L-1\}$ are fed back through a sub-band in a short period of the terminal. Equation (1) may be equivalently converted into a following matrix:

$$w = \begin{bmatrix} W_1 & 0 \\ 0 & W_1 \end{bmatrix} \begin{bmatrix} P_1 & 0 \\ 0 & P_2 \end{bmatrix} \begin{bmatrix} C_1 \\ C_2 \end{bmatrix} \qquad (2)$$

where $$W_1 = [b_{k_1}^{(0)} k_2^{(0)} b_{k_1}^{(1)} k_2^{(1)} \ldots b_{k_1}^{(L-1)} k_2^{(L-1)}], \quad (3)$$

$$P_r = \text{diag}(p_r) = \text{diag}([p_{r,l,0} p_{r,l,1} \ldots p_{r,l,L-1}]^T), r=0,1 \quad (4)$$

$$C_r = [c_{r,l,0} c_{r,l,1} \ldots c_{r,l,L-1}]^T, r=0,1 \quad (5)$$

At this time, a dimension of C fed back by the terminal is determined according to the number of non-zero elements in P, for example, L=8, when the number of non-zero elements in P is four, the dimension of C fed back by the terminal is 4*Lay, or PMI index of C fed back by the terminal is codeword index in a 4*Lay codebook. If numbers of non-zero elements in P corresponding to different layers are different, the terminal may have different dimensions of C corresponding to different layers at this time. For each layer the dimension of C means the number of elements in the C. Of course, the dimension of C in each layer may be determined to be the same according to a certain rule (at this time, the dimension of C represents the number of rows in C). On the other hand, since the number of non-zero elements in P varies in a range of [0, L], when C is fed back through a PMI (i.e., when the codeword index of C in a codebook is fed back), the codebook may not have all dimensions within a range of [1, L], but only some limited numbers. Then at this time, the terminal searches for a minimum dimension larger than the number of non-zero elements in P of dimensions supported by the codebook (or the codebook dimension of C is determined according to codebook dimensions supported by other rules), such as L=8, and the codebook has a codebook with transmitting antennas (or the number of measuring reference signal ports) of {1, 4, 8}, and the number of non-zero elements in P is three, then the PMI index of C fed back by the terminal is the codeword index in the codebook with a transmitting antenna of {4}. The base station obtains which i compensation phase corresponds to the fed back C according to P fed back by the terminal, for example:

$p_0$=[0 1 0 0.5 0 1 0.8 0], C_feedback=$[c_{f0}\ c_{f1}\ c_{f2}\ c_{f3}]^T$, the terminal obtains one of followings from equation (5):

$$C_0 = [0 c_{f0} 0 c_{f1} 0 c_{f2} c_{f3} 0]^T, \text{ or}$$

$$C_0 = [1 c_{f0} 1 c_{f1} 1 c_{f2} c_{f3} 1]^T, \text{ or}$$

$$C_0 = [x c_{f0} x c_{f1} x c_{f2} x]^T;$$

where X has a fixed phase value, or the base station and the terminal agree on the certain rule for a phase compensation without feedback.

In the above embodiments, the dimension of C is determined by the number of non-zero elements in P. This embodiment also does not exclude that the dimension of C is determined by the relationship between elements in P and the predetermined threshold, for example, the dimension of C is determined by the number of elements with a value greater than the predetermined threshold in P.

Alternatively, another way of implementing this embodiment is to determine a restriction set of C in codewords according to the number of non-zero elements in P (or the number of elements with the value greater than the predetermined threshold in P). Specifically, for example, the dimension of C in the above equation (1) to equation (5) is L. For example, if C is fed back through the codewords, then different restriction sets of C in L-dimensional codewords are obtained by different numbers of non-zero elements in P (or different numbers of elements with the value greater than the predetermined threshold in P). The terminal feeds back C according to the restriction sets, for example, L=8, $p_0$=[0 1 0 0.5 0 1 0.8 0], C_feedback corresponds to the number of rows of eight (i.e. the C_feedback is located at a codebook with eight transmitting measurement reference signal ports). However, selectable codewords for the C_feedback are limited. Specifically, for example, a codebook with the number of rows of eight (i.e., eight measurement reference signal ports) includes a total of 256 codewords, while selectable codewords for the C_feedback form a subset of the 256 codewords.

Embodiment 12

In this embodiment, M resources are selected by the terminal according to the correlation degree of resources in the candidate resource set, and/or difference intervals of channel quality of resources in the candidate resource set, and/or an ordering of channel quality of resources in the candidate resource set.

Specifically, the selection criterion may be at least one of following criteria.

Selection criterion 1: The M resources are resources with a minimum correlation degree in the candidate resource set. For example, a channel corresponding to each resource is a Rx*Ty channel response matrix (the Rx is the number of receiving antennas, the Ty is the number of transmitting antennas, or the number of transmitting reference signal ports), then a correlation degree of two resources is a correlation degree of two matrices at this point; in an embodiment Ty=1, the correlation degree of the two resources is a correlation degree of vectors; in an embodiment Rx=1, and Ty=1, the correlation degree of the two resources is a correlation degree of two scalars, where the channel response matrix (or channel response vector, or channel response scalar) may be a frequency domain channel response, a time domain channel response, an instantaneous channel response, or an average channel response. In an embodiment, the correlation degree of vectors may also be expressed by an angle between vectors. The smaller the angle is, the greater the correlation degree is; while the greater the angle is, the smaller the correlation degree is. Alternatively, the correlation degree of vectors is represented by the cosine value of the angle between vectors, i.e. the correlation degree of A and B is represented by $\rho(A,B) = \cos(\Delta\theta)$, where the angle between vectors of A and B is represented as $\Delta\theta$. The greater a value of $\rho(A, B)$, the greater the correlation degree; while the smaller the value of $\rho(A, B)$, the smaller the correlation degree. Alternatively, the greater an absolute value of $\rho(A, B)$, the greater the correlation degree; while the smaller the absolute value of $\rho(A, B)$, the smaller the correlation degree.

In an embodiment, the correlation degree of two complex scalars may be represented by the angle between two-dimensional vectors, each two-dimensional vector being derived from a scalar using a form of (real part, imaginary part). The smaller the angle is, the greater the correlation degree is; and the greater the angle is, the smaller the correlation degree is. Specifically, for example, two complex numbers are $a = r_1 e^{j\theta_1}$, $b = r_2 e^{j\theta_2}$, the correlation degree between those two is related to $\rho(a,b) = \cos(\theta_1 - \theta_2)$. The greater $\rho(a,b)$ is, the greater the correlation degree is; or, the greater an absolute value of $\rho(a,b)$ is, the greater the correlation degree is.

Selection criterion 2: The difference intervals of channel quality of the M resources are greater than the predetermined threshold. Each resource corresponds to channel quality (where the channel quality may be a CQI, a RSRP, or other values), the channel quality of the M resources at this time are agreed in sequence, and differences of channel quality of the M resources are greater than the predetermined threshold.

Selection criterion 3: The arrival time intervals of the M resources are greater than the predetermined threshold. Specifically, for example, a resource corresponds to a transmitting beam and a receiving beam, and this channel response includes arrival time, such as arrival time of a main path of multiple paths, or arrival time of a first path, or average arrival time of all paths.

Selection criterion 4: The M resources are resources with the maximum time energy sum in the candidate set. A time energy sum corresponding to a resource is a sum of products of arrival time and signal energy of multiple paths corresponding to the resource. Specifically, a resource corresponds to a transmitting beam and a receiving beam. At this time, a channel response of a transmitting-receiving beam pair has multiple paths in time domain, each path corresponding to a channel response value. For example, the number of multiple paths of the transmitting-receiving beam pair is P. At this time, the time energy sum is a sum of products of time and energy of all paths.

Selection criterion 5: The M resources are resources with the maximum correlation degree in the candidate resource set. The correlation degree of the resources is a correlation degree of channel response corresponding to the resources, which is similar as that described in selection criterion 1 and will not be repeated here.

Selection criterion 6: The resources in the candidate resource set are sorted according to channel quality, and one resource is selected every predetermined number of resources to obtain the M resources. Alternatively, the resources may be sorted according to the channel quality from large to small, and then part of the resources may be selected at intervals of a first predetermined number of resources, and then the rest resources may be selected at intervals of a second predetermined number of resources, thereby M selected resources are obtained. For example, the candidate resource set includes ten resources with an ordering of {7, 1, 2, 3, 5, 6, 4, 8, 10, 9} according to channel quality. First, {7, 2} are selected at an interval of one resource, and then {6, 10} are selected at an interval of two resources (it should be noted that at this point the resources are selected from the rest of following resources in every two resources), and finally resources of {7, 2, 6, 10} are obtained as selected resources. The resources in the candidate resource set may also be further divided into multiple parts, and resources are selected at intervals of a different number of resources in each part.

Selection criterion 7: A first resource (such as a resource with optimal channel quality) is selected in the candidate resource set, then correlation degrees between other resources and the selected resource are obtained, a second resource with a minimum correlation degree of the selected resource in the candidate resource set is selected, then a third resource with a minimum correlation degree sum of correlation degrees with {the first resource, the second resource} in resources after the selected resources are removed from the candidate resource set, and then M resources are selected by analogy.

Selection criterion 8: The selected M resources form a matrix, which has a maximum rank of an equivalent matrix formed by resources in the candidate resource set, or a minimum correlation degree of vectors in the equivalent matrix. Specifically, for example, each resource is represented by a vector, which represents a receiving vector from a transmitting reference signal port to Rx receiving antennas of a receiving end, i.e. the vector has a dimension of 1*Rx, then the M resources form the equivalent M*Rx matrix. It is assumed that the number of resources in the candidate resource set is T_Total, the equivalent M*Rx matrix formed by the M resources has a rank greater than or equal to a rank of any equivalent matrix formed by M resources randomly selected from the T_Total resources, or a correlation degree between row vectors of the M*Rx equivalent matrix formed by the M resources is less than or equal to a correlation degree between row vectors of any equivalent matrix formed by M resources randomly selected from the T_Total resources.

Selection criterion 9: The M resources are resources with the correlation degree less than or equal to the predetermined threshold in the candidate resource set, specifically, for example, a first resource (such as the resource with the optimal channel quality) from the candidate resource set is selected, and then other resources are selected, correlation degrees between other resources and the first resource are less than or equal to the predetermined threshold.

Selection criterion 10: The M resources are resources with the correlation degree less than or equal to the predetermined threshold in the candidate resource set. For example, a first resource (such as the resource with the optimal channel quality) in the candidate resource set is selected, then a second resource is selected, which has a correlation degree with the first resource less than or equal to the predetermined threshold, then a third resource is selected, the third resource has a correlation degree of the first resource and the second resource less than or equal to the predetermined threshold, and so on to obtain M resources.

Selection criterion 11: The M resources are resources with the correlation degree less than or equal to the predetermined threshold in the candidate resource set. Specifically, the correlation degree between two resources of the M resources is less than or equal to the predetermined threshold. In this embodiment, the channel quality may be one of following information: a CQI, a RSRP, or other channel quality characterization values.

Embodiment 13

In this embodiment, the equivalent matrix formed by the M resources is implemented in a way that, if a resource corresponds to a Rx*Tx matrix, the equivalent matrix formed by the M resources is a matrix formed by stacking a number M of Rx*Tx matrices. Specifically, for example, each resource is represented by a vector, which represents a receiving vector from a transmitting reference signal port to Rx receiving antennas of a receiving end, i.e., the vector has a dimension of 1*Rx, then M resources form an equivalent M*Rx matrix or an equivalent Rx*M matrix.

The equivalent matrix formed by the M resources is implemented in another way that, the M resources include Rx receiving resources and Tx transmitting resources in total (when there may be overlap between transmitting resources or receiving resources of different resources), then the equivalent matrix corresponding to the M resources is a Rx*Tx matrix, each element of the matrix representing a channel response from an i-th transmitting resource to a j-th receiving resource.

Embodiment 14

In this embodiment, the indication information of the M resources includes the indication information for grouping, different groups satisfy following characteristics: correlation degrees of resources in a same group are less than or equal to the predetermined threshold; in an embodiment, correlation degrees of resources in different groups are greater than the predetermined threshold at this time.

Of course, in another embodiment, correlation degrees of resources in a same group are greater than the predetermined threshold; in an embodiment, correlation degrees of resources in different groups are less than or equal to the predetermined threshold at this time.

Where correlation degrees of resources in one group less than or equal to the predetermined threshold may be selected according to correlation degrees in embodiment 12, which are less than or equal to the predetermined threshold, it will not be repeated here.

Embodiment 15

In this embodiment the indication information of the M resources includes the indication information for multi-level grouping, resources in different level groups are quasi-co-located concerning different types of channel characteristic parameter.

Specifically, for example, a first level group includes at least one second level group, all resources in the first level group are quasi-co-located concerning a first type channel characteristic parameter, and all resources in one second level group are quasi-co-located concerning a second type channel characteristic parameter.

In an embodiment the first type and second type channel characteristic parameters include at least one of following characteristics: the first type channel characteristic parameter is different from the second type channel characteristic parameter; the first type channel characteristic parameter is a subset of the second type channel characteristic parameter; one of the first type channel characteristic parameter or the second type channel characteristic parameter includes a channel characteristic parameter of an average delay. For example, only the second type channel characteristic parameter includes the parameter of the average delay, while the first type channel characteristic parameter does not include the parameter of the average delay.

In an embodiment, the first type channel characteristic parameter includes at least one of following parameters: a receiving panel, a transmitting panel, an average arrival angle, a center arrival angle, an average angle extension, a vertical average arrival angle, a horizontal average arrival angle, an average departure angle, a center departure angle, a vertical average departure angle, a horizontal average departure angle, a multipath extension, or an average gain. In an embodiment, resources in the first level group are not quasi-co-located at least concerning following parameters: the average delay, a doppler shift, and a doppler spread.

In an embodiment, the second type channel characteristic parameter includes at least one of following parameters: a receiving antenna, the average arrival angle, the center arrival angle, the average angle extension, the vertical average arrival angle, the horizontal average arrival angle, the average departure angle, the center departure angle, the vertical average departure angle, the horizontal average departure angle, the average delay, the multipath extension, or the average gain. In an embodiment, resources in the first level group are not quasi-co-located at least concerning following parameters: the doppler shift and the doppler spread.

In an embodiment, at this time, resources in the first level group share a receiving panel, different second level groups in the first level group correspond to different subarrays of a panel, or different second level groups in the first level group correspond to different sets of receiving beams of a panel.

In an embodiment, different second level groups in the first level group correspond to different sets of receiving beams of a panel, each panel may only generate a set of receiving beams at a time, and different sets of receiving beams may only be generated in time, for example, each TXRU of the panel corresponds to a receiving beam. At this time, a receiving beam set may also be referred to as a receiving mode of the panel.

In this embodiment, the two resources being quasi-co-located concerning a type of channel characteristic parameters represents that channel characteristic parameters of a resource may be obtained or derived from channel characteristic parameters of the other resource.

Embodiment 16

In this embodiment the M resources are selected according to the correlation degree of resources and the channel quality of resources.

Specifically, the channel quality of the M resources satisfies the first predetermined condition and the correlation degree of the M resources satisfies the second predetermined condition. The first predetermined condition is one of following conditions: the selected resources are Mx resources with optimal channel quality in the candidate resource set, and Mx may be an integer greater than or equal to M, or the selected resources are resources with channel quality greater than the predetermined threshold. The second predetermined condition includes one of following conditions: the correlation degree is a minimum correlation degree in a selectable resource set (the selectable resource set is the candidate resource set or a subset of the candidate resource set); the correlation degree of the selected resources is less than the predetermined threshold; or the correlation degree of the selected resources is 0, that is, the two resources are orthogonal.

In a second selection manner, resources with channel quality satisfying the first predetermined condition are first selected from the candidate resource set, and then resources with a resource correlation degree satisfying the second predetermined condition are selected to obtain the M resources. The first predetermined condition is one of following conditions: the selected resources are Mx resources with optimal channel quality in the candidate resource set, and Mx may be an integer greater than or equal to M, or the selected resources are resources with channel quality greater than the predetermined threshold. The second predetermined condition includes one of following conditions: the correlation degree is the minimum correlation degree in the selectable resource set (the selectable resource set is the candidate resource set or a subset of the candidate resource set); the correlation degree of the selected resources is less than a predetermined threshold; or the correlation degree of the selected resources is 0, that is, the two resources are orthogonal.

In a third selection manner, resources with a resource correlation degree satisfying the second predetermined condition are first selected from the candidate resource set, and then resources with channel quality satisfying the first predetermined condition are selected from the selected resources to obtain the M resources. The first predetermined condition is one of following conditions: the selected resources are Mx resources with optimal channel quality in the candidate resource set, and Mx may be an integer greater than or equal to M, or the selected resources are resources with channel quality greater than the predetermined threshold. The second predetermined condition includes one of following conditions: the correlation degree is the minimum correlation degree in the selectable resource set; the correlation degree of the selected resources is less than the predetermined threshold; or the correlation degree of the selected resources is 0, that is, the two resources are orthogonal.

Embodiment 17

In this embodiment the M resources are selected according to the correlation degree of resources, the channel quality of resources and resources corresponding to receiving resources.

In the present disclosure resources in the candidate resource set include at least one of following resources: a transmitting beam resource, a transmitting antenna resource, a transmitting port resource, a transmitting frequency domain resource, a transmitting sequence resource, a transmitting time domain resource, a transmitting mode resource, a receiving beam resource, a receiving antenna resource, a receiving port resource, a receiving frequency domain resource, a receiving sequence resource, a receiving time domain resource, or a receiving mode resource, where the port resources is a reference signal port resource.

In the present disclosure transmitting resources include at least one of following resources: a transmitting beam resource, a transmitting antenna resource, a transmitting port resource, a transmitting frequency domain resource, a transmitting sequence resource, a transmitting time domain resource, a transmitting mode resource, a transmitting panel resource, or a transmitting process.

In the present disclosure receiving resources include at least one of following resources: a receiving beam resource, a receiving antenna resource, a receiving port resource, a receiving frequency domain resource, a receiving sequence resource, a receiving time domain resource, a receiving mode resource, a receiving panel resource, or a receiving process.

In the disclosure the correlation degree of resources less than the predetermined threshold may be implemented in a way that the correlation degree of resources is less than the predetermined threshold, and in another way that an absolute value of the correlation degree of resources is less than the predetermined threshold.

Figure 6:
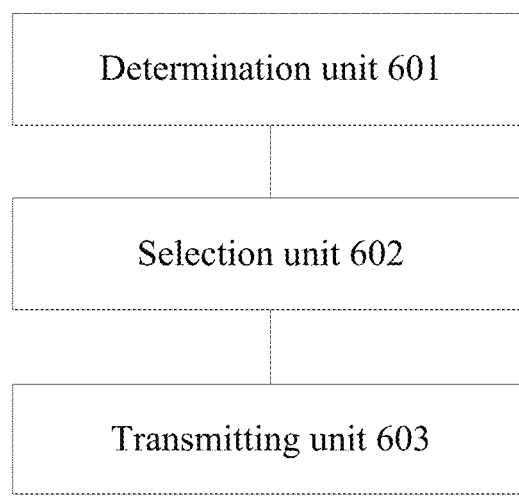
FIG. 6 is a schematic diagram of structural composition of a device for feeding back channel information according to an embodiment of the present disclosure.

FIG. 6 is a schematic diagram of a device for feeding back channel information according to an embodiment of the present disclosure. As shown in FIG. 6 the device includes a determination unit 601, a selection unit 602 and a transmitting unit 603.

The determination unit 601 is configured to determine a candidate resource set.

The selection unit 602 is configured to select M resources from the candidate resource set.

The transmitting unit 603 is configured to transmit at least one of indication information or channel state information of the selected M resources to a first communication node, where M is a positive integer.

A selection criterion for selecting the M resources from the candidate resource set is determined in at least one of following manners: a selection criterion or a selection criterion set is agreed with the first communication node, or a selection criterion or a selection criterion set is obtained according to received indication information transmitted by the first communication node, and the selection criterion set includes at least one selection criterion.

In an embodiment of the present disclosure the M resources are selected according to at least one of following information:
 channel quality of resources;
 a correlation degree of resources;
 a receiving resource corresponding to resources;
 a transmitting resource corresponding to resources;
 an arrival time interval of resources; or
 multipath characteristics corresponding to resources.

In an embodiment of the present disclosure the selection criterion includes at least one of:
 M resources with optimal channel quality are selected from the candidate resource set as the M resources;
 X1 resources with optimal channel quality are selected from the candidate resource set, R1 receiving resources corresponding to the X1 resources with the optimal quality are determined, and M transmitting resources with optimal channel quality are selected from all transmitting resources corresponding to the receiving resources;
 X1 resources with optimal channel quality are selected from the candidate resource set, R1 receiving resources corresponding to the X1 resources with the optimal quality are determined, channel quality sum of each transmitting resource in the R1 receiving resources is determined, and M transmitting resources with an optimal channel quality sum are selected;
 X2 resources with optimal channel quality are selected from the candidate resource set, R2 receiving resources corresponding to the X2 resources with the optimal channel quality are determined, and at least one transmitting resource with optimal channel quality for each of the R2 receiving resources is selected to form the M resources;
 an optimal receiving resource for each transmitting resource is selected from the candidate resource set to obtain T resources, and M resources with optimal channel quality are selected from the T resources;
 an optimal transmitting resource for each receiving resource is selected from the candidate resource set to obtain R resources, and M resources with optimal channel quality are selected from the R resources;
 M resources are selected from the candidate resource set, the M resources form an equivalent channel with a maximum rank;
 M resources are selected from the candidate resource set, the M resources form an equivalent channel with a maximum channel capacity;
 R1 receiving resources and M transmitting resources are selected from the candidate resource set, and an equivalent channel formed by the M transmitting resources and the R1 receiving resources has a channel matrix with a maximum rank;
 R1 receiving resources and M transmitting resources are selected from the candidate resource set, and an equivalent channel formed by the M transmitting resources and the R1 receiving resources has a channel matrix with a maximum channel capacity;
 R1 receiving resources are selected from the candidate resource set, and M1 resources with a minimum correlation degree of channel response are selected for each of the R1 receiving resources, and all resources selected for the R1 receiving resources form the M resources;
 the M resources are selected according to a correlation degree of resources and channel quality of resources;
 the M resources are selected according to the correlation degree of resources;

the M resources with a difference interval of channel quality greater than a predetermined threshold are selected;

the M resources with an arrival time interval greater than the predetermined threshold are selected;

M resources with a maximum time energy sum are selected from the candidate resource set, and a time energy sum corresponding to a resource is a sum of products of arrival time and signal energy of multiple paths corresponding to the resource;

M resources with a worst channel quality are selected from the candidate resource set as the M resources; or resources in the candidate resource set are sorted according to channel quality of resources, and one resource in every predetermined number of resources is selected to obtain the M resources.

X1 and X2 are natural numbers less than or equal to N1, and N1 is the number of resources included in the candidate resource set; where R1, R2 and R are natural numbers less than or equal to R_Total, and R_Total is the number of receiving resources included in the candidate resource set; and T and M1 are natural numbers less than or equal to T_Total, and T_Total is the number of transmitting resources included in the candidate resource set.

In an embodiment of the present disclosure, the M resources selected according to the correlation degree and the channel quality of resources satisfy one of following characteristics: channel quality of the M resources satisfies a first predetermined condition and a correlation degree of the M resources satisfies a second predetermined condition;

resources with channel quality satisfying the first predetermined condition are selected from the candidate resource set first, and then resources with a resource correlation degree satisfying the second predetermined condition are selected to obtain the M resources; or resources with a resource correlation degree satisfying the second predetermined condition are selected from the candidate resource set first, and then resources with channel quality satisfying the first predetermined condition are selected from the selected resources to obtain the M resources.

In an embodiment of the present disclosure, the M resources selected according to the correlation degree of resources satisfy at least one of following characteristics:

the M resources are resources with a minimum correlation degree in the candidate resource set;

the correlation degree of the M resources is less than or equal to the predetermined threshold;

the M resources are composed of resources with a correlation degree less than or equal to the predetermined threshold in the candidate resource set; the correlation degree of any two of the M resources is 0; or the correlation degree of every two of the M resources has a sum less than or equal to a sum of a correlation degree of every two of resources in a first resource subset, where the first subset is composed of any M resources in the candidate resource set.

In an embodiment of the present disclosure each resource of the candidate resource set includes a transmitting resource and a receiving resource.

In an embodiment of the present disclosure the M resources comprise at least one of following characteristics:

the number of receiving resources included in the M resources is less than or equal to M;

the number of transmitting resources included in the M resources is less than or equal to M;

the M resources comprise a receiving resource and M transmitting resources;

the M resources comprise M receiving resources and a transmitting resource;

the M resources comprise M receiving resources and M transmitting resources;

one or more transmitting resources of the M resources sharing a receiving resource have a minimum correlation degree among all correlation degrees of all transmitting resources sharing the receiving resource;

a channel response matrix of an equivalent channel formed by receiving resources and transmitting resources of the M resources has a maximum rank; or a channel response matrix of an equivalent channel formed by the receiving resources and the transmitting resources of the M resources has a maximum channel capacity.

In an embodiment of the present disclosure a value of M is determined in at least one of following manners:

the indication information carrying the value of M transmitted by the first communication node is received;

the value of M is determined according to channel quality threshold agreed with the first communication node;

the value of M is determined according to a threshold for correlation between resources agreed with the first communication node;

the value of M is determined according to M_Max, where M_Max is a value agreed with the first communication node, and the value of M agreed with the first communication node is less than or equal to the M_Max;

the value of M is determined according to the number of receiving resources;

it is agreed with the first communication node that the value of M value is equal to the number of resources included in the candidate resource set;

the value of M is determined according to the number of receiving antennas; or the value of M is determined according to the number of receiving panels.

In an embodiment of the present disclosure, the indication information transmitted by the first communication node carries a feedback type, and the selection criterion is obtained according to the feedback type; or, the indication information transmitted by the first communication node carries feature types satisfied by the M resources, and the selection criterion is obtained according to the feature types.

In an embodiment of the present disclosure, the indication information of the M resources includes index information of transmitting resources and quantity information of receiving resources; or, the indication information of the M resources includes the index information of transmitting resources and quantity information of receiving resources corresponding to each transmitting resource.

In an embodiment of the present disclosure, the candidate resource set includes one of following characteristics:

the candidate resource set includes N first sets, where each first set corresponds to a piece of rank information, and N is a natural number;

the candidate resource set corresponds to a piece of rank information; or the rank information is included in configuration information of a second set related to the candidate resource set.

In an embodiment of the present disclosure the rank information includes one of following characteristics:

the rank information is obtained through the indication information transmitted by the first communication node;

the rank information corresponding to a set represents the maximum number of layers supported by the set;

the rank information corresponding to a set represents the number of layers supported by the set;

selected rank information is obtained according to the N first sets, and is fed back to the first communication node; or the selected rank information is fed back implicitly through feeding back set index information of the N first sets.

In an embodiment of the present disclosure, the second set includes at least one of: a CSI report setting, a CSI measurement set, or a connection set, where the CSI measurement set includes at least one connection, and each connection includes a resource set and a report setting.

In an embodiment of the present disclosure, X1 is equal to 1 and/or X2 is equal to 1.

Each of R1, R2 and R is equal to an integral multiple of the number of receiving antennas.

In an embodiment of the present disclosure, the channel state information of the M resources includes at least one of following characteristics:

channel quality information of each of the M resources is fed back;

channel quality of a resource with optimal channel quality in the M resources is fed back;

channel quality of a resource with worst channel quality in the M resources is fed back; or average channel quality of the M resources is fed back.

In an embodiment of the present disclosure the indication information of the M resources includes at least one of following characteristics:

resources are sorted according to channel quality of the resources in the indication information of the M resources;

the M resources comprise all resources of the candidate resource set;

the indication information of the M resources includes the value of M;

the indication information of the M resources further includes indication information of the selection criterion, where the M resources are obtained based on the selection criterion;

the indication information of the M resources includes indication information for grouping; or the indication information of the M resources includes indication information for multi-level grouping.

In an embodiment of the present disclosure, the grouping includes at least one of following characteristics:

resources in a first level group are quasi-co-located concerning a first type channel characteristic parameter;

resources in a second level group are quasi-co-located concerning a second type channel characteristic parameter;

resources in a same group have a correlation degree less than or equal to a predetermined threshold; or resources in different groups have a correlation degree greater than the predetermined threshold.

In an embodiment of the present disclosure the first type and second type channel characteristic parameters comprise at least one of following characteristics:

the first type channel characteristic parameter is different from the second type channel characteristic parameter;

the first type channel characteristic parameter is a subset of the second type channel characteristic parameter; and one of the first type channel characteristic parameter or the second type channel characteristic parameter includes a channel characteristic parameter of an average delay.

The first type channel characteristic parameter includes at least one of following parameters: a receiving panel, a transmitting panel, an average arrival angle, a center arrival angle, an average angle extension, a vertical average arrival angle, a horizontal average arrival angle, an average departure angle, a center departure angle, a vertical average departure angle, a horizontal average departure angle, a multipath extension, or an average gain; and the second type channel characteristic parameter includes at least one of following parameters: a receiving antenna, the average arrival angle, the center arrival angle, the average angle extension, the vertical average arrival angle, the horizontal average arrival angle, the average departure angle, the center departure angle, the vertical average departure angle, the horizontal average departure angle, the average delay, the multipath extension, or the average gain.

In an embodiment of the present disclosure the indication information transmitted by the first communication node includes at least one of following indication information:

indication information of a RRC signaling;

indication information of a MAC CE signaling; or indication information of a DCI signaling.

Those skilled in the art should understand that implementation of functions of each unit in the device for feeding back channel information shown in FIG. 6 may be understood with reference to the above-mentioned description of the method for feeding back channel information.

The embodiments of the present disclosure also provide a device for feeding back channel information, which includes one or more processors (the processors may include, but are not limited to, a processing device such as a microprocessor (MCU), a programmable logic device (FPGA) and other processing devices), a memory for storing data, and a transmitting device for communication functions. One of ordinary skill in the art may understand that the device for feeding back channel information may also include more or fewer components. The memory in the device for feeding back channel information stores each unit in the device for feeding back channel information shown in FIG. 6.

In the embodiments of the present disclosure, a device for feeding back channel information is further provided. The device includes a determination unit and a transmitting unit.

The determination unit is configured to determine the number of receiving resources.

The transmitting unit is configured to transmit the number of the receiving resources to a first communication node.

In an embodiment, the number of the receiving resources has a relationship with at least one of following information:

the number of time domain units required for transmitting the signal, the signal is transmitted by the first communication node after the first communication node receives feedback information;

the number of reference signal ports;

the number of precoding polling periods; or the number of precoding units.

In an embodiment, the receiving resources comprise one of following characteristics:

the number of the receiving resources is the number of receiving resources corresponding to a transmitting resource;

the number of the receiving resources is the number of receiving resources corresponding to more than one transmitting resources; or the number of the receiving resources is the number of receiving resources corresponding to a second receiving resource.

FIG. 7 is a schematic structural diagram of a device for receiving channel information according to an embodiment of the present disclosure. As shown in FIG. 7 the device includes a receiving unit 701.

The receiving unit is configured to receive at least one of indication information or channel state information of M resources transmitted by a second communication node. The M resources are selected by the second communication node.

The M resources are obtained from a candidate resource set by the second communication node based on a selection criterion, the selection criterion includes at least one of following characteristics: a selection criterion or a selection criterion set is agreed with the second communication node, or the indication information including the selection criterion or the selection criterion set is transmitted to the second communication node. The selection criterion set includes at least one selection criterion.

In an embodiment of the present disclosure the M resources are selected according to at least one of following information:
channel quality of resources;
a correlation degree of resources;
a receiving resource corresponding to resources;
a transmitting resource corresponding to resources;
an arrival time interval of resources; or
multipath characteristics corresponding to resources.

In an embodiment of the present disclosure, the selection criterion includes at least one of:
M resources with optimal channel quality are selected from the candidate resource set as the M resources;
X1 resources with optimal channel quality are selected from the candidate resource set, R1 receiving resources corresponding to the X1 resources with the optimal quality are determined, and M transmitting resources with optimal channel quality are selected from all transmitting resources corresponding to the receiving resources;
X1 resources with optimal channel quality are selected from the candidate resource set, R1 receiving resources corresponding to the X1 resources with the optimal quality are determined, channel quality sum of each transmitting resource in the R1 receiving resources is determined, and M transmitting resources with an optimal channel quality sum are selected;
X2 resources with optimal channel quality are selected from the candidate resource set, R2 receiving resources corresponding to the X2 resources with the optimal channel quality are determined, and at least one transmitting resource with optimal channel quality for each of the R2 receiving resources is selected to form the M resources;
an optimal receiving resource for each transmitting resource is selected from the candidate resource set to obtain T resources, and M resources with optimal channel quality are selected from the T resources;
an optimal transmitting resource for each receiving resource is selected from the candidate resource set to obtain R resources, and M resources with optimal channel quality are selected from the R resources;
M resources are selected from the candidate resource set, where the M resources form an equivalent channel with a maximum rank;
M resources are selected from the candidate resource set, where the M resources form an equivalent channel with a maximum channel capacity;
R1 receiving resources and M transmitting resources are selected from the candidate resource set, where an equivalent channel formed by the M transmitting resources and the R1 receiving resources has a channel matrix with a maximum rank;
R1 receiving resources and M transmitting resources are selected from the candidate resource set, where an equivalent channel formed by the M transmitting resources and the R1 receiving resources has a channel matrix with a maximum channel capacity;
R1 receiving resources are selected from the candidate resource set, and M1 resources with a minimum correlation degree of channel response are selected for each of the R1 receiving resources, where all resources selected for the R1 receiving resources form the M resources;
the M resources according to a correlation degree of resources and channel quality of resources are selected;
the M resources according to the correlation degree of resources are selected;
the M resources with a difference interval of channel quality greater than a predetermined threshold are selected;
the M resources with an arrival time interval greater than the predetermined threshold are selected;
M resources with a maximum time energy sum are selected from the candidate resource set, where a time energy sum corresponding to a resource is a sum of products of arrival time and signal energy of multiple paths corresponding to the resource;
M resources with a worst channel quality from the candidate resource set are selected as the M resources; or
resources in the candidate resource set are sorted according to channel quality of resources, and one resource in every predetermined number of resources is selected to obtain the M resources.

X1 and X2 are natural numbers less than or equal to N1, and N1 is the number of resources included in the candidate resource set; and R1, R2 and R are natural numbers less than or equal to R_Total, and R_Total is the number of receiving resources included in the candidate resource set; where T and M1 are natural numbers less than or equal to T_Total, and T_Total is the number of transmitting resources included in the candidate resource set.

The candidate resource set is agreed in advance with the second communication node, each resource in the candidate resource set includes a transmitting resource and a receiving resource.

In an embodiment of the present disclosure, the selection of the M resources according to the correlation degree and the channel quality of resources satisfy one of following characteristics:
channel quality of the M resources satisfies a first predetermined condition and a correlation degree of the M resources satisfies a second predetermined condition.
resources with channel quality satisfying the first predetermined condition are selected from the candidate resource set first, and then resources with a resource correlation degree satisfying the second predetermined condition are selected from the selected resources to obtain the M resources; or
resources with a resource correlation degree satisfying the second predetermined condition are selected from the candidate resource set first, and then resources with channel quality satisfying the first predetermined condition are selected from the selected resources to obtain the M resources.

In an embodiment of the present disclosure, the M resources selected according to the correlation degree of resources satisfy at least one of following characteristics:
the M resources are M resources with a minimum correlation degree in the candidate resource set;
the correlation degree of the M resources is less than or equal to the predetermined threshold;

the M resources are composed of resources with a correlation degree less than or equal to the predetermined threshold in the candidate resource set; the correlation degree of any two resources of the M resources is 0; or the correlation degree of every two resources of the M resources has a sum less than or equal to a sum of a correlation degree of every two of resources in a first resource subset, where the first subset is composed of any M resources in the candidate resource set.

In an embodiment of the present disclosure, the M resources comprise at least one of following characteristics:

the number of receiving resources included in the M resources is less than or equal to M;

the number of transmitting resources included in the M resources is less than or equal to M;

the M resources comprise a receiving resource and M transmitting resources;

the M resources comprise M receiving resources and a transmitting resource;

the M resources comprise M receiving resources and M transmitting resources;

one or more transmitting resources of the M resources sharing a receiving resource have a minimum correlation degree among all correlation degrees of all transmitting resources sharing the receiving resource;

a channel response matrix of an equivalent channel formed by receiving resources and transmitting resources of the M resources has a maximum rank; or a channel response matrix of an equivalent channel formed by the receiving resources and the transmitting resources of the M resources has a maximum channel capacity.

In an embodiment of the present disclosure M-related information is determined and/or notified in at least one of following manners:

indication information carrying a value of M is transmitted to the second communication node;

indication information carrying threshold information of channel quality is transmitted to the second communication node;

indication information carrying threshold information of a resource correlation degree is transmitted to the second communication node;

indication information carrying M_Max to the second communication node is transmitted, where the value of M agreed with the second communication node is less than or equal to M_Max;

the value of M is determined according to the number of receiving resources;

it is agreed with the second communication node that the value of M is equal to the number of resources included in the candidate resource set;

the value of M is determined according to the number of receiving antennas of the second communication node; or the value of M is determined according to the number of receiving panels of the second communication node.

In an embodiment of the present disclosure the indication information transmitted to the second communication node carries a feedback type, and the selection criterion is notified through the feedback type; or, the indication information transmitted to the second communication node carries feature types satisfied by the M resources, and the selection criterion is notified through the feature types.

In an embodiment of the present disclosure, the indication information of the M resources includes index information of transmitting resources and quantity information of receiving resources; or, the indication information of the M resources includes the index information of transmitting resources and quantity information of receiving resources corresponding to each transmitting resource.

In an embodiment of the present disclosure the candidate resource set includes one of following characteristics:

the candidate resource set includes N first sets, where each first set corresponds to a piece of rank information, and N is a natural number;

the candidate resource set corresponds to a piece of rank information; or the rank information is included in configuration information of a second set related to the candidate resource set.

In an embodiment of the present disclosure the rank information includes one of following characteristics:

the rank information is configured through the indication information transmitted to the second communication node;

the rank information corresponding to a set represents the maximum number of layers supported by the set;

the rank information corresponding to a set represents the number of layers supported by the set;

the second communication node is configured to obtain feedback information of a rank indication (RI) according to the N first sets; or index information of the N first sets fed back by the second communication node is received to obtain a value of the R1 selected by the second communication node.

In an embodiment of the present disclosure, the second set includes at least one of: a CSI report setting, a CSI measurement set, or a connection set, where the CSI measurement set includes at least one connection, and each connection includes a resource set and a report setting.

In an embodiment of the present disclosure, the X1 is equal to 1 and/or the X2 is equal to 1.

Each of R1, R2 and R is equal to an integral multiple of the number of receiving antennas.

In an embodiment of the present disclosure, the channel state information of the M resources includes at least one of following characteristics:

channel quality information of each of the M resources is fed back;

channel quality of a resource with optimal channel quality in the M resources is fed back;

channel quality of a resource with worst channel quality in the M resources is fed back; or average channel quality of the M resources is fed back.

In an embodiment of the present disclosure, the indication information of the M resources includes at least one of following characteristics:

resources are sorted according to channel quality of the resources in the indication information of the M resources;

the M resources comprise all resources of the candidate resource set;

the indication information of the M resources includes the value of M;

the indication information of the M resources further includes indication information of the selection criterion, where the M resources are obtained based on the selection criterion;

the indication information of the M resources includes indication information for grouping; or the indication information of the M resources includes indication information for multi-level grouping.

In an embodiment of the present disclosure the grouping includes at least one of following characteristics:

resources in a first level group are quasi-co-located concerning a first type channel characteristic parameter;

resources in a second level group are quasi-co-located concerning a second type channel characteristic parameter;

resources in a same group have a correlation degree less than or equal to a predetermined threshold; or resources in different groups have a correlation degree greater than the predetermined threshold.

In an embodiment of the present disclosure the first type and second type channel characteristic parameters comprise at least one of following characteristics:

the first type channel characteristic parameter is different from the second type channel characteristic parameter;

the first type channel characteristic parameter is a subset of the second type channel characteristic parameter; or one of the first type channel characteristic parameter or the second type channel characteristic parameter includes a channel characteristic parameter of an average delay.

The first type channel characteristic parameter includes at least one of following parameters: a receiving panel, a transmitting panel, an average arrival angle, a center arrival angle, an average angle extension, a vertical average arrival angle, a horizontal average arrival angle, an average departure angle, a center departure angle, a vertical average departure angle, a horizontal average departure angle, a multipath extension, or an average gain; and the second type channel characteristic parameter includes at least one of following parameters: a receiving antenna, the average arrival angle, the center arrival angle, the average angle extension, the vertical average arrival angle, the horizontal average arrival angle, the average departure angle, the center departure angle, the vertical average departure angle, the horizontal average departure angle, the average delay, the multipath extension, or the average gain.

In an embodiment of the present disclosure, the indication information transmitted to the second communication node includes at least one of following indication information:

indication information of a RRC signaling;
indication information of a MAC CE signaling; or
indication information of a DCI signaling.

In an embodiment of the present disclosure, indication information for notifying of the selection criterion includes receiving state type information of the second communication node corresponding to the channel state information of the second communication node; and/or, the channel state information fed back by the second communication node is received, and receiving state information of the second communication node corresponding to the channel state information of the second communication node is determined.

In an embodiment of the present disclosure, the channel state information reported by the second communication node is received, and a correspondence between the channel state and a receiving state of the second communication node includes at least one of:

the channel state is obtained by the second communication node using one receiving beam of one TXRU;

the channel state is obtained by the second communication node using all TXRUs of one panel;

the channel state is obtained by the second communication node using part of panels, where all TXRUs in each of the part of panels are used;

the channel state is obtained by the second communication node using part of panels, where all or part of TXRUs in each of the part of panels are used; or the channel state is obtained by the second communication node using all TXRUs of all panels.

In an embodiment of the present disclosure, each resource of the candidate resources may include a transmitting resource and a receiving resource, or only include a transmitting resource, i.e. the receiving resources corresponding to each candidate resource are the same at this time.

Those skilled in the art should understand that implementation functions of each unit in the device for receiving channel information shown in FIG. 7 may be understood with reference to the above-mentioned description of the method for receiving channel information.

The embodiments of the present disclosure also provide a device for receiving channel information, which includes one or more processors (the processors may include, but are not limited to, a processing device such as a microprocessor (MCU), a programmable logic device (FPGA), a memory for storing data, and a transmission device for communication functions. One of ordinary skill in the art may understand that the device for receiving channel information may also include more or fewer components. The memory in the device for feeding back channel information stores each unit in the device for receiving channel information shown in FIG. 7.

In an embodiment of the present disclosure, a device for feeding back channel information is provided, the device includes a receiving unit.

The receiving unit is configured to receive feedback information transmitted by a second communication node, where the feedback information includes the number of receiving resources.

The device further includes a determination unit.

The determination unit is configured to determine transmission information of a signal, according to the feedback information transmitted by the second communication node, the signal is transmitted to the second communication node after the first communication node receives the feedback information.

In an embodiment, the transmission information includes at least one of following information:

the number of time domain units required for transmitting signals;
the number of reference signal ports;
a precoding polling period; or
the number of precoding units.

In an embodiment, the number of the receiving resources has a relationship with at least one of following information:

the number of time domain units required by signals, where the signals are signals transmitted by the first communication node after the first communication node receives feedback information;
the number of reference signal ports;
a precoding polling period; or
the number of precoding units.

In an embodiment, the receiving resources comprise one of following characteristics:

the number of the receiving resources is the number of receiving resources corresponding to a transmitting resource;

the number of the receiving resources is the number of receiving resources corresponding to more than one transmitting resources; or the number of the receiving resources is the number of receiving resources corresponding to a second receiving resource.

Those skilled in the art will appreciate that embodiments of the present disclosure may be provided as methods, systems, or computer program products. Therefore, the present disclosure may take a form of hardware embodiments, software embodiments, or embodiments combining software and hardware aspects. Furthermore, the present disclosure may take a form of computer program products implemented on one or more computer usable storage media (including, but not limited to, a magnetic disk storage, an optical storage, etc.) with computer usable program codes embodied therein.

The present disclosure is described with reference to flowcharts and/or block diagrams of methods, apparatus (systems), and computer program products according to the embodiments of the present disclosure. It should be understood that each flow and/or block in the flowchart and/or block diagram, and combinations of flows in the flowcharts and/or blocks in the block diagrams, may be implemented by computer program instructions. These computer program instructions may be provided to a processor of a general purpose computer, special purpose computer, embedded processor, or other programmable data processing apparatus to produce a machine, such that the instructions executed by the processor of the computer or other programmable data processing apparatus produce means for implementing functions specified in a flow or flows of flowcharts and/or a block or blocks of block diagrams.

These computer program instructions may also be stored in a computer-readable memory that may direct a computer or other programmable data processing apparatus to function in a particular manner, such that the instructions stored in the computer-readable memory produce an article of manufacture including instruction means that implement the functions specified in a flow or flows of flowcharts and/or a block or blocks of block diagrams.

These computer program instructions may also be loaded onto a computer or other programmable data processing apparatus, so that a series of operational steps are performed on the computer or other programmable apparatus to produce a computer implemented process, the instructions that execute on the computer or other programmable apparatus provide steps for implementing the functions specified in a flow or flows of flowcharts and/or a block or blocks of block diagrams.

Correspondingly, the embodiments of the disclosure also provides a computer storage medium in which computer programs are stored, which is configured to execute the method for feeding back channel information or the method for receiving channel information of an embodiments of the disclosure.

What is claimed is:

1. A method for feeding back channel information, comprising:
    transmitting first feedback information; and
    determining, according to a relationship between elements in the first feedback information and a predetermined threshold, a number of elements in second feedback information;
    wherein the first feedback information and the second feedback information correspond to a same vector group, the first feedback information comprises amplitude information corresponding to at least one vector in the vector group, and the second feedback information comprises phase information corresponding to at least one vector in the vector group;
    wherein determining the number of elements in the second feedback information according to the relationship between the elements in the first feedback information and the predetermined threshold comprises one of followings:
    determining the number of elements in the second feedback information corresponding to each layer according to a number of elements with a value greater than the predetermined threshold in the first feedback information corresponding to the layer; or
    determining, according to the number of the elements with the value greater than the predetermined threshold in the first feedback information, the number of elements in the second feedback information.

2. The method according to claim 1, further comprising:
    in response to determining that the number of elements in the second feedback information is larger than 0, transmitting the second feedback information.

3. The method according to claim 1,
    wherein the number of elements with the value greater than the predetermined threshold in the first feedback information corresponding to the layer is determined according to a number of elements corresponding to the layer in the first feedback information with a value greater than the predetermined threshold.

4. The method according to claim 1, wherein
    D information elements in the second feedback information correspond to D elements with a value greater than a predetermined threshold in the first feedback information; wherein D is greater than or equal to 0, and less than or equal to a number of the elements in the first feedback information.

5. The method according to claim 1, wherein each element having a value equal to or less than the predetermined threshold in the first feedback information corresponds to second information with a fixed value, each element having a value greater than the predetermined threshold in the first feedback information corresponds to second information included in the second feedback information.

6. The method according to claim 1, comprising:
    determining a number of receiving resources, and transmitting the number of the receiving resources to a first communication node.

7. The method according to claim 6, wherein the number of the receiving resources satisfies at least one of following characteristics:
    a number of time domain units required for a signal is determined according to the number of the receiving resources, wherein the signal is transmitted by the first communication node after the first communication node receives the number of receiving resources;
    a number of time division resources in a beam measurement phase is determined according to the number of the receiving resources;
    a number of time division resources in a next beam measurement phase is determined according to the number of the receiving resources and a number of receiving antennas of a second communication node;
    the number of the receiving resources is a number of receiving resources corresponding to one transmitting resource;
    the number of the receiving resources is a number of receiving resources corresponding to more than one transmitting resource;
    the number of the receiving resources is a number of receiving resources corresponding to the second communication node;
    the number of the receiving resources comprises a number of receiving beams; or the number of the receiving resources is comprised in capability information reported by the second communication node, wherein one transmitting resource corresponds to one transmitting beam, the second communication node is responsible for reporting the number of the receiving resources.

8. A method for feeding back channel information, comprising:

receiving first feedback information; and determining, according to a relationship between elements in the first feedback information and a predetermined threshold, a number of elements in second feedback information;

wherein the first feedback information and the second feedback information correspond to a same vector group, the first feedback information comprises amplitude information corresponding to at least one vector in the vector group, and the second feedback information comprises phase information corresponding to at least one vector in the vector group;

wherein determining the number of elements in the second feedback information according to the relationship between the elements in the first feedback information and the predetermined threshold comprises one of followings:

determining the number of elements in the second feedback information corresponding to each layer according to a number of elements with a value greater than the predetermined threshold in the first feedback information corresponding to the layer; or determining, according to the number of the elements with the value greater than the predetermined threshold in the first feedback information, the number of elements in the second feedback information.

9. The method according to claim 8, wherein the number of elements with the value greater than the predetermined threshold in the first feedback information corresponding to the layer is determined according to a number of elements corresponding to the layer in the first feedback information with a value greater than the predetermined threshold.

10. The method according to claim 8, wherein

D information elements in the second feedback information correspond to D elements with a value greater than a predetermined threshold in the first feedback information; wherein D is greater than or equal to 0, and less than or equal to a number of the elements in the first feedback information.

11. The method according to claim 8, wherein each element having a value equal to or less than the predetermined threshold in the first feedback information corresponds to second information with a fixed value, each element having a value greater than the predetermined threshold in the first feedback information corresponds to second information included in the second feedback information.

12. The method according to claim 8, comprising:

receiving a number of receiving resources transmitted by a second communication node.

13. The method according to claim 12, wherein the number of the receiving resources satisfies at least one of following characteristics:

a number of time domain units required for a signal is determined according to the number of the receiving resources, wherein the signal is transmitted by a first communication node after the first communication node receives the number of receiving resources;

a number of time division resources in a beam measurement phase is determined according to the number of the receiving resources;

a number of time division resources in a next beam measurement phase is determined according to the number of the receiving resources and a number of receiving antennas of the second communication node;

the number of the receiving resources is a number of receiving resources corresponding to one transmitting resource;

the number of the receiving resources is a number of receiving resources corresponding to more than one transmitting resource;

the number of the receiving resources is a number of receiving resources corresponding to the second communication node;

the number of the receiving resources comprises a number of receiving beams; or the number of the receiving resources is comprised in capability information reported by the second communication node, wherein one transmitting resource corresponds to one transmitting beam, the first communication node is responsible for receiving the number of the receiving resources transmitted by the second communication node.

14. A device for feeding back channel information, comprising:

a processor; and a memory for storing instructions executable by the processor, wherein the processor is configured to:

transmit first feedback information; and determine, according to a relationship between elements in the first feedback information and a predetermined threshold, a number of elements in second feedback information;

wherein the first feedback information and the second feedback information correspond to a same vector group, the first feedback information comprises amplitude information corresponding to at least one vector in the vector group, and the second feedback information comprises phase information corresponding to at least one vector in the vector group;

wherein the processor is specifically configured to:

determine the number of elements in the second feedback information corresponding to each layer according to a number of elements with a value greater than the predetermined threshold in the first feedback information corresponding to the layer; or determine the number of elements in the second feedback information according to the number of the elements with the value greater than the predetermined threshold in the first feedback information.

15. The device according to claim 14, wherein the number of elements with the value greater than the predetermined threshold in the first feedback information corresponding to the layer is determined according to a number of elements corresponding to the layer in the first feedback information with a value greater than the predetermined threshold.

16. The device according to claim 14, wherein

D information elements in the second feedback information correspond to D elements with a value greater than a predetermined threshold in the first feedback information; wherein D is greater than or equal to 0, and less than or equal to a number of the elements in the first feedback information.

17. A device for feeding back channel information, comprising:
   a processor; and
   a memory for storing instructions executable by the processor,
wherein the processor is configured to implement the method of claim 5.

18. The device according to claim 17, wherein the processor is specifically configured to:
   determine the number of elements in the second feedback information corresponding to each layer according to a number of elements with a value greater than the predetermined threshold in the first feedback information corresponding to the layer,
   wherein the number of elements with the value greater than the predetermined threshold in the first feedback information corresponding to the layer is determined according to a number of elements corresponding to the layer in the first feedback information with a value greater than the predetermined threshold.

19. The device according to claim 17, wherein
D information elements in the second feedback information correspond to D elements with a value greater than a predetermined threshold in the first feedback information; wherein D is greater than or equal to 0, and less than or equal to a number of the elements in the first feedback information.

* * * * *